(12) United States Patent
Goodhart et al.

(10) Patent No.: US 10,810,613 B1
(45) Date of Patent: Oct. 20, 2020

(54) AD SEARCH ENGINE

(75) Inventors: Jonah Goodhart, Ithaca, NY (US); Noah Goodhart, Ithaca, NY (US); Robert Collier Crowell, New York, NY (US); Robert Ken Miller, New York, NY (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 122 days.

(21) Appl. No.: 13/436,044

(22) Filed: Mar. 30, 2012

Related U.S. Application Data

(60) Provisional application No. 61/542,059, filed on Sep. 30, 2011, provisional application No. 61/476,505, filed on Apr. 18, 2011.

(51) Int. Cl.
*G06Q 30/02* (2012.01)

(52) U.S. Cl.
CPC ..... *G06Q 30/0244* (2013.01); *G06Q 30/0201* (2013.01); *G06Q 30/0242* (2013.01)

(58) Field of Classification Search
USPC ..................................... 705/50–79; 3/50–79
See application file for complete search history.

(56) References Cited

U.S. PATENT DOCUMENTS

| | | | |
|---|---|---|---|
| 6,108,637 A | 8/2000 | Blumenau | |
| 6,115,680 A | 9/2000 | Cofee | |
| 6,230,204 B1 | 5/2001 | Fleming, III | |
| 6,327,619 B1 | 12/2001 | Blumenau | |
| 6,418,470 B2 | 7/2002 | Blumenau | |
| 7,263,497 B1 | 8/2007 | Wiser et al. | |
| 7,310,609 B2 | 12/2007 | Middleton, III et al. | |
| 7,386,473 B2 | 6/2008 | Blumenau | |
| 7,613,635 B2 | 11/2009 | Blumenau | |
| 7,660,737 B1 * | 2/2010 | Lim et al. | 705/14.49 |
| 7,716,326 B2 | 5/2010 | Blumenau | |

(Continued)

OTHER PUBLICATIONS

WELOVEAD.com WELOVEAD, availlable on Mar. 7, 2011 http://web.archive.org/web/20110307041600/http://www.welovead.com/en/works/database.*

(Continued)

*Primary Examiner* — Chrystina E Zelaskiewicz
*Assistant Examiner* — Alfred H Tsui
(74) *Attorney, Agent, or Firm* — Kilpatrick Townsend & Stockton LLP

(57) ABSTRACT

An ad search engine comprises a click tag parser, a rich media parser, an ad copy database, a request/query processing module, a user interface module and a content preservation module. The ad search engine advantageously receives and stores information about ad placement, context and advertising statistical and metadata in the ad copy database. In response to a query, the request/query processing module searches the ad copy database for advertisements matching the input query. The user interface module receives the results and presents them in a novel user interface composed of an array of tiles where each tiles represents a placement of the advertisement. The present invention also includes a several novel methods including a method for displaying ad search results, a method for generating an ad search result user interface, a method for populating an ad database, a method for ad preservation and a method for generating derived insights.

9 Claims, 23 Drawing Sheets

(56) References Cited

U.S. PATENT DOCUMENTS

| | | | |
|---|---|---|---|
| 7,756,974 B2 | 7/2010 | Blumenau | |
| 7,917,755 B1 | 3/2011 | Giliyaru et al. | |
| 8,108,245 B1 | 1/2012 | Hosea et al. | |
| 8,190,604 B2* | 5/2012 | Wen | G06F 17/30247 |
| | | | 707/732 |
| 8,255,491 B1 | 8/2012 | Arzur | |
| 8,266,115 B1 | 9/2012 | Park et al. | |
| 8,386,314 B2 | 2/2013 | Kirkby et al. | |
| 8,508,532 B1 | 8/2013 | Logan et al. | |
| 8,880,996 B1 | 11/2014 | Deshpande et al. | |
| 9,282,048 B1 | 3/2016 | Fichter et al. | |
| 2002/0098891 A1 | 7/2002 | Graham et al. | |
| 2002/0103698 A1 | 8/2002 | Cantrell | |
| 2002/0111865 A1 | 8/2002 | Middleton, III | |
| 2002/0165773 A1 | 11/2002 | Natsuno et al. | |
| 2003/0200145 A1 | 10/2003 | Krassner et al. | |
| 2004/0036716 A1 | 2/2004 | Jordahl | |
| 2005/0210533 A1 | 9/2005 | Copeland et al. | |
| 2005/0235030 A1 | 10/2005 | Lauckhart et al. | |
| 2006/0026063 A1 | 2/2006 | Collins | |
| 2006/0080681 A1 | 4/2006 | Anwar et al. | |
| 2007/0050251 A1 | 3/2007 | Jain et al. | |
| 2007/0198344 A1* | 8/2007 | Collison | G06F 17/30864 |
| | | | 705/14.1 |
| 2007/0255702 A1 | 11/2007 | Orme | |
| 2007/0266305 A1* | 11/2007 | Cong | G06Q 30/02 |
| | | | 715/700 |
| 2008/0004958 A1 | 1/2008 | Ralph et al. | |
| 2008/0114709 A1* | 5/2008 | Dixon et al. | 706/13 |
| 2008/0120165 A1 | 5/2008 | Yan | |
| 2008/0320125 A1 | 12/2008 | O'Sullivan et al. | |
| 2009/0076899 A1* | 3/2009 | Gbodimowo | G06Q 30/0273 |
| | | | 705/14.69 |
| 2009/0157813 A1 | 6/2009 | Jung et al. | |
| 2009/0187546 A1 | 7/2009 | Hamilton Whyte | |
| 2009/0216621 A1 | 8/2009 | Anderson et al. | |
| 2009/0265243 A1 | 10/2009 | Karassner et al. | |
| 2009/0271260 A1 | 10/2009 | Sharma et al. | |
| 2009/0300528 A1* | 12/2009 | Stambaugh | G06F 3/04817 |
| | | | 715/764 |
| 2010/0023868 A1 | 1/2010 | Bonforte et al. | |
| 2010/0095317 A1 | 4/2010 | Toebes et al. | |
| 2010/0121676 A1 | 5/2010 | Jackson | |
| 2010/0146380 A1 | 6/2010 | Rousso et al. | |
| 2010/0169792 A1* | 7/2010 | Ascar | G06F 11/3414 |
| | | | 715/744 |
| 2010/0241597 A1 | 9/2010 | Chen et al. | |
| 2010/0251128 A1 | 9/2010 | Cordasco | |
| 2010/0287054 A1 | 11/2010 | Zohar et al. | |
| 2010/0295774 A1 | 11/2010 | Hennessey | |
| 2010/0310175 A1 | 12/2010 | Holt | |
| 2011/0029393 A1 | 2/2011 | Apprendi et al. | |
| 2011/0072131 A1 | 3/2011 | Zohar et al. | |
| 2011/0125587 A1* | 5/2011 | Netzer | G06Q 30/0272 |
| | | | 705/14.68 |
| 2011/0137737 A1 | 6/2011 | Baird et al. | |
| 2011/0153362 A1* | 6/2011 | Valin | G06Q 50/24 |
| | | | 705/3 |
| 2011/0153435 A1* | 6/2011 | Pisaris-Henderson | |
| | | | G06Q 30/02 |
| | | | 705/14.73 |
| 2011/0163971 A1 | 7/2011 | Wagner et al. | |
| 2011/0239243 A1 | 9/2011 | Dierks et al. | |
| 2011/0320286 A1 | 12/2011 | Zohar et al. | |
| 2012/0078707 A1 | 3/2012 | Ramakrishnan et al. | |
| 2012/0106793 A1 | 5/2012 | Gershenson et al. | |
| 2012/0317472 A1 | 12/2012 | Chernysh | |
| 2012/0324098 A1 | 12/2012 | De Jager et al. | |
| 2013/0031470 A1 | 1/2013 | Daly, Jr. et al. | |
| 2013/0124342 A1 | 5/2013 | Virkar et al. | |
| 2013/0166377 A1 | 6/2013 | Kirkby et al. | |
| 2013/0179767 A1 | 7/2013 | Bajric et al. | |
| 2013/0335576 A1 | 12/2013 | Gotschlich | |
| 2014/0040786 A1 | 2/2014 | Swanson et al. | |
| 2014/0181634 A1 | 6/2014 | Compain et al. | |
| 2014/0282642 A1 | 9/2014 | Needham et al. | |
| 2017/0316431 A1 | 11/2017 | Goodhart et al. | |
| 2017/0316443 A1 | 11/2017 | Goodhart et al. | |
| 2017/0316446 A1 | 11/2017 | Goodhart et al. | |

OTHER PUBLICATIONS

WELOVEAD, WebDesignServed available on May 19, 2010, retrieved from http://www.webdesignserved.com/gallery/WELOVEAD-beta/ 517326, on Aug. 5, 2015, referred to hereinafter as WELOVEAD.*

Clicktale "Case Study:Fugees.ru" ( Published online http://blog. clicktale.com/ on Sep. 12, 2007) (Year: 2007).*

WELOVED, "WebDesignServed," May 19, 2010, 2 pages, http:// www.webdesignserved.com.

WELOVED.com WELOVED, dated Mar. 7, 2011, 14 pages, http:// web.archive.org/web/2011 0307041600/http://www.welovead.com/ en/works/database.

U.S. Appl. No. 13/857,897, filed Apr. 5, 2013, Final Office Action dated Feb. 2, 2016 all pages.

U.S. Appl. No. 13/857,897, filed Apr. 5, 2013, Final Office Action dated Mar. 14, 2014 all pages.

U.S. Appl. No. 13/857,897, filed Apr. 5, 2013, Final Office Action dated Jun. 20, 2017, 19 pages.

U.S. Appl. No. 13/857,897, filed Apr. 5, 2013, Non-Final Office Action dated Jun. 28, 2013 all pages.

U.S. Appl. No. 13/857,897, filed Apr. 5, 2013, Non-Final Office Action dated May 1, 2015 all pages.

U.S. Appl. No. 13/857,897, filed Apr. 5, 2013, Non-Final Office Action dated Nov. 8, 2016 all pages.

U.S. Appl. No. 13/436,082, Final Office Action dated Oct. 11, 2016, 16 pages.

U.S. Appl. No. 13/436,082, Non-Final Office Action dated Apr. 25, 2017, 16 pages.

U.S. Appl. No. 13/436,082, Non-Final Office Action dated Jun. 25, 2015, 53 pages.

U.S. Appl. No. 13/802,288, Advisory Action dated Oct. 7, 2014, 4 pages.

U.S. Appl. No. 13/802,288, Final Office Action dated Dec. 23, 2016, 14 pages.

U.S. Appl. No. 13/802,288, Final Office Action dated Jun. 17, 2014, 37 pages.

U.S. Appl. No. 13/802,288, Final Office Action dated May 26, 2015, 55 pages.

U.S. Appl. No. 13/802,288, Non-Final Office Action dated Aug. 31, 2017, 12 pages.

U.S. Appl. No. 13/802,288, Non-Final Office Action dated Jan. 2, 2014, 16 pages.

U.S. Appl. No. 13/802,288, Non-Final Office Action dated Jun. 3, 2016, 19 pages.

U.S. Appl. No. 13/802,288, Non-Final Office Action dated Jan. 30, 2015, 51 pages.

U.S. Appl. No. 13/857,897, Advisory Action dated Jul. 2, 2014, 3 pages.

Schwartz, et al., "Clicktale heatmaps" Clicktale, retrieved from: https://www.clicktale.com/resources/blog/clicktale-heatmaps/ Apr. 3, 2007, 5 pages.

U.S. Appl. No. 15/824,833 received a Notice of Allowance dated Apr. 8, 2020, 10 pages.

* cited by examiner

AD SEARCH ENGINE

CROSS-REFERENCE TO RELATED APPLICATION

This application claims the benefit under 35 U.S.C. § 119(e) of U.S. Provisional Application Ser. No. 61/542,059, entitled "OPTIMIZATION OF ONLINE ADVERTISING ASSETS & AD SEARCH ENGINE" filed on Sep. 30, 2011, the entire contents of which are incorporated herein by reference. This application also claims the benefit under 35 U.S.C. § 119(e) of U.S. Provisional Application Ser. No. 61/476,505, entitled "COMPUTER SOFTWARE RELATING TO ADVERTISING OVER COMPUTER NETWORKS" filed on Apr. 18, 2011, the entire contents of which are incorporated herein by reference.

BACKGROUND OF THE INVENTION

The present invention relates systems and methods for searching and displaying on-line advertisements that have been presented on networks. In particular, the present invention relates to an ad search engine and related methods for retrieving and presenting advertisements and meta data

DESCRIPTION OF THE RELATED ART

The Internet and other types of on-line communication have become increasingly popular to the point where they now compete with traditional media such as print media and broadcast media for the attention of users. Because users are spending so much more time on line viewing content, playing games and on social networks, advertisers are spending greater amounts of their advertising dollars on Internet advertising or online advertising. It is now commonplace for advertisers to use online advertising as a major component of any advertising campaign.

Online advertising typically refers to any type of promotion that uses the Internet or the World Wide Web to deliver marketing messages and attract the attention of customers. Examples of online advertising include contextual ads on search engine result pages, banner ads, rich media ads, social networking ads, interstitial advertising, etc. Online advertising is typically provided from an ad server to a publisher that includes the ads with the published or served content. These new forms of online advertising are advantageous because they provide better targeting and placement then traditional media.

In order to effectively price online advertising some analytics and metrics have been developed. For example, an impression is a measure of the number of times an ad is displayed whether users interact with that ad or not. Such placements are priced in cost per thousand impressions or CPM. Internet traffic may also be measured in cost per click (CPC) where advertisers pay hosting services only when users interact with the ad or "click" on the add. There are other limited metrics that are captured by web analytics service providers in an attempt to measure the effectiveness of such online advertising campaigns.

One problem with existing web analytics is that the amount of information provided about user interaction with the ads and other context information is very limited. Most existing systems only provide limited information about impression such as the date, time and publisher that served the advertisement. In many instances, the analytics systems only confirm that the ad was served and not whether it was actually viewed by the user. For example, issues with the browser, latency, or other factors may preclude the ad from being displayed and reviewed by the user. Existing systems incorrectly consider those impressions as have been presented and viewed by the user. Existing systems are unable to provide more information about the context in which the ad was placed, actual information about user interaction with the ad and other information that is valuable to the advertisers.

Another problem with existing systems is that the ads are very transient and automatically served by web servers based on a number of factors only some which are under the control advertisers. As noted above, there is often no way for the advertisers to determine what ads were presented, and more importantly the manner in which the ads were presented to the user. For example, the prior art does not have any way to search ads that were presented and provide historical information about the presentation of those ads.

SUMMARY OF THE INVENTION

In one innovative aspect, an ad search engine for searching and presenting advertisements is disclosed. The ad search engine comprises a click tag parser, a rich media parser, an ad copy database, a request/query processing module, a user interface module and a content preservation module. The ad search engine advantageously receives and stores information about ad placement and context and stores it in the ad copy database. The ad search engine also stores other advertising statistical and metadata corresponding to those ads in the ad copy database. In response to a query, the request/query processing module searches the ad copy database for advertisements matching the input query. The user interface module receives the results from the input query and presents them in a novel user interface composed of an array of tiles where each tiles represents a single creative of the advertisement. The ad search engine is particularly advantageous because it provides a way for advertisers to access and review actual ad placement and their associated analytic data. The ad search engine is also advantageous because it returns as results the ads themselves as well as the context in which the ads were placed and presented. The present invention also includes a several novel methods such as a method for displaying ad search results, a method for generating an ad search result user interface, a method for populating an ad database, a method for ad preservation and a method for generating derived insights.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF EMBODIMENTS

Figure 1:
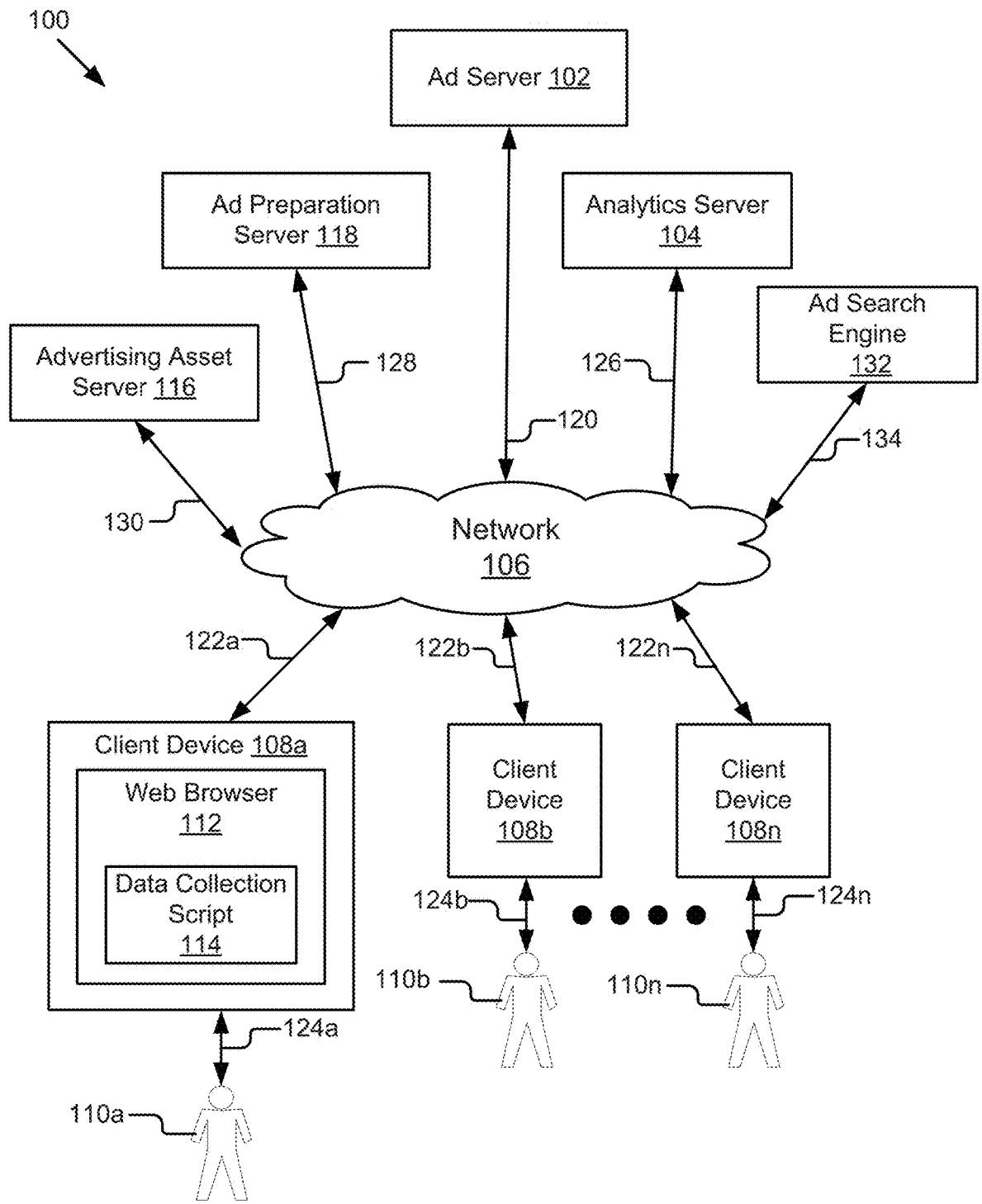
FIG. 1 is a block diagram illustrating an embodiment of an advertising system in accordance with the present invention.

FIG. 1 illustrates a block diagram of one embodiment of the advertising system 100 of the present invention. The advertising system 100 advantageously collects and presents advertising analytics for on line advertisements. The advertising system 100 also retrieves and presents on-line advertisements in a similar manner to how they were presented on line. For many examples in the specification below, an online advertisement (ad) is any text, picture or video whose purpose is advertising communication including any flash asset, any image of Internet Advertising Board (IAB) or industry standard width and height that is clickable including any recursion into iframes from the original page. The illustrated ad system 100 includes an advertising asset server 116, an ad preparation server 118, an ad server 102, an analytics server 104, a network 106, an ad search engine 132, and one or more client devices 108a-108n that are accessed by users 110a-110n. In the illustrated embodiment, these entities are communicatively coupled via a network 106. Although only three client devices 108a-n are illustrated, it should be recognized that any number of client devices 108n are available to any number of users 110n. Furthermore, while only one network 106 is coupled to the advertising asset server 116, the ad preparation server 118, the ad server 102, the analytics server 104, the ad search engine 132, and the one or more client devices 108a-108n, in practice any number of networks 106 can be connected to the entities. In one embodiment, the advertising asset server 116, the ad preparation server 118, the ad server 102, the analytics server 104, and the ad search engine 132 are hardware servers including a processor, memory, and network communication capabilities.

The network 106 is a conventional type, wired or wireless, and may have any number of configurations such as a star configuration, token ring configuration or other configurations. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The client device 108a is representative of client devices 108a-108n and is a conventional type of computing device, for example, a personal computer, a hardware server, a laptop computer, a tablet computer or smart phone. The client devices 108a-108n are coupled to the network 106 by signal lines 122a-122n, respectively. In one embodiment, the client device 108 is coupled to receive online advertisements from the ad server 102 and other content from publishing sites or third party servers (not shown). The client device 108 includes a web browser 112 for presenting online content and advertisements to the user. The web browser 112 presents ads and other content, and receives input from the user 110 as represented by signal line 124. The web browser 112 and data collection script 114 are operable on the client device 108. The data collection script 114 collects information about user interaction with advertisements, ad placement and other advertising analytics, and sends that information to the analytics server 104. The operation of the data collection script 114 is described in more detail below with reference to FIG. 10. The data collection script 114 advantageously collects information non-intrusively and incrementally as will be described in more detail below. In one embodiment, the data collection script 114 is a program, code or software that: 1) Loads as a result of an ad being served; 2) Loads as a result of a network call placed on the page by its publisher; 3) Executes in the same time window as the advertising content and the page load; 4) Extracts cursor movement or gesture data, browser or user data, and data pertaining to the environment in which the ad has been placed (also referred to as input data); 5) Transmits that data, during page rendering, to an analytics server 104; and 6) creates data from which downstream analytics can determine the duration that the page was viewed during any particular rendering of the page.

The advertising asset server 116 is a computer program running on a hardware system for storing and providing advertisements or assets to other systems that will ultimately deliver the ads to the end user. The advertising asset server 116 is coupled to the network 106 by signal line 130 to receive advertisements or assets from advertisers. In one embodiment, the advertising asset server 116 stores the advertisement or asset that will be delivered to the client devices 108. For example, the asset includes ad copy, ad content, JavaScript or flash that when executed by the client device 108 in the web browser 112 presents the advertisement to the user 110 as designed by and intended by the advertiser. The advertisers interact with the advertising asset server 116 to upload and store advertisements on the advertising asset server 116. These advertisements are then available for delivery to the ad preparation server 118 or the ad server 102 which in turn process the advertisements and deliver them to the client device 108.

The ad preparation server 118 is a computer program running on a hardware system for preparing advertisements for ultimate delivery to the client devices 108. In one embodiment, the ad preparation server 118 retrieves advertisements from the advertising asset server 116 and modifies them by adding the data collection script 114. The modified ads are then delivered by the ad preparation server 118 to the ad server 102 for combination with content and delivery to the client device 108. The ad preparation server 118 is coupled to the network 106 by signal line 128 for communication with the advertising asset server 116 and the ad server 102. The ad preparation server 118 is described in more detail below with reference to FIGS. 2 and 7.

The ad server 102 is a computer program running on a hardware system for placing advertisements on websites. For example, the ad server 102 may be a web server that receives advertisements from the ad preparation server 118 or the advertising asset server 116 and delivers them to website visitors. The ad server 102 is coupled to the network 106 by signal line 120 for receiving ads from the ad preparation server 118 or the advertising asset server 116 and for delivering the ads to third party servers, sites or domains (not shown).

The analytics server 104 is a computer program running on a hardware system for collecting and presenting information about advertising analytics. In particular, the analytics server 104 receives advertising data from the data collection script 114 running on the client device 108. The analytics server 104 may also receive basic ad statistics from the ad server 102. The analytics server 104 also processes the advertising data to produce reports and user interfaces. The analytics server 104 is described in more detail below with reference to FIGS. 3, 5, 8, 11 and 12. The analytics server 104 is coupled by signal line 126 to the network 106 for communication with the client devices 108a-108n and the ad server 102.

The ad search engine 132 is a computer program running on a hardware system for performing searches of advertisements and other associated metadata. The ad search engine 132 is coupled to receive advertising placement information from the ad server 102. The ad search engine includes and maintains a database of advertisements and the context in which they were delivered. The ad search engine 132 will be described in more detail below with reference to FIGS. 4, 9, 13A-15B. The ad search engine 132 is coupled by signal line 134 to the network 106 for communication with the other components of the system 100.

Ad Preparation Server 118

Figure 2:
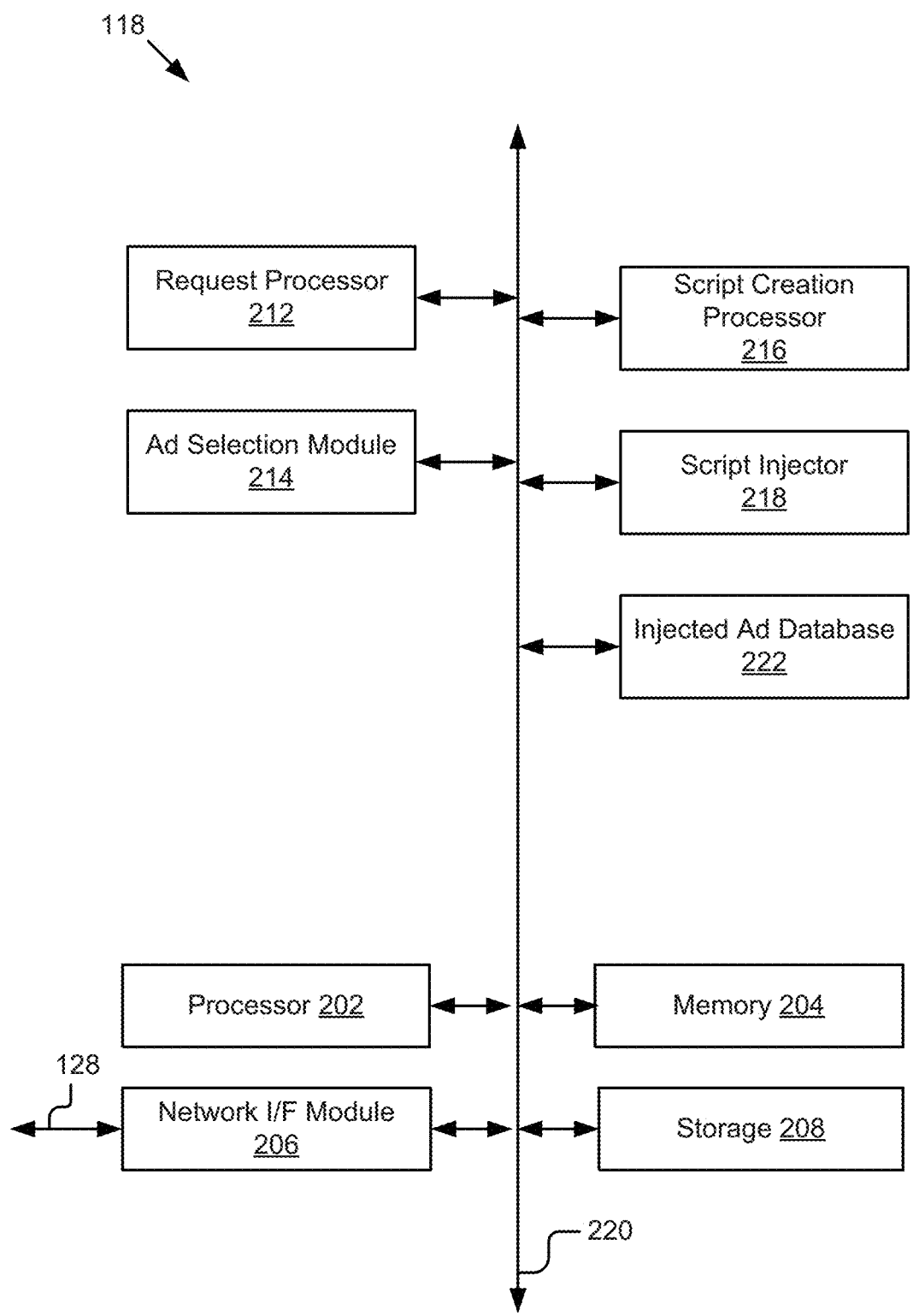
FIG. 2 is a block diagram illustrating an embodiment of an ad preparation server in accordance with the present invention.

FIG. 2 is a block diagram of one embodiment of the ad preparation server 118. In this embodiment, the ad preparation server 118 comprises: a processor 202, a memory 204, a network interface (I/F) module 206, storage 208, a request processor 212, an ad selection module 214, a script creation processor 216, a script injector 218, a bus 220 and an injected ad database 222. As noted above, the ad preparation server 118 is responsive to requests from the ad server 102 for advertisements. The ad preparation server 118 receives requests from the ad server 102 and in response retrieves an ad asset from the advertising asset server 116, injects a data collection script and then sends the modified ad to the ad server 102.

The processor 202 comprises an arithmetic logic unit, a microprocessor, a general-purpose controller or some other processor array to perform computations and provide electronic display signals to a display device. The processor 202 is coupled to the bus 220 for communication with the other components. Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 204 stores instructions and/or data that may be executed by processor 202. The memory 204 is coupled to the bus 220 for communication with the other components. The instructions and/or data may comprise code for performing any and/or all of the techniques described herein. The memory 204 may be a dynamic random access memory (DRAM) device, a static random access memory (SRAM) device, flash memory or some other memory device.

The network interface (I/F) module 206 is coupled to network 106 by signal line 128 and coupled to the bus 220. The network interface module 206 includes ports for wired connectivity such as but not limited to USB, SD, or CAT-5, etc. The network interface module 206 links the processor 202 to the network 106 that may in turn be coupled to other processing systems. The network interface module 206 provides other connections to the network 106 using standard network protocols such as TCP/IP, HTTP, HTTPS and SMTP. In other embodiments, the network interface module 206 includes a transceiver for sending and receiving signals using Wi-Fi, Bluetooth® or cellular communications for wireless communication. The network interface (I/F) module 206 provides a communication path for the components of the ad preparation server 118 to the network 106 and other systems.

In one embodiment, the storage 208 stores data, information and instructions used by the ad preparation server 118. Such stored information includes information about users, publishers, ads, assets and other information. The storage 208 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage 208 is coupled by the bus 220 for communication with other components of the ad preparation server 118.

The request processor 212 is software, code or routines for receiving and processing requests for advertisements from the ad server 102. The request processor 212 is coupled to receive requests from the ad server 102. In some embodiments, the request processor 212 operates as a controller of the overall process of creating a modified ad and delivering it to the ad server 102 and communicates with the other components 214, 216, 218, 222 for that purpose. The request processor 212 receives the request from the ad server and promulgates the request to the ad selection module 214 and the script creation processor 216 so that an ad may be selected and a script created, respectively. The request processor 212 is coupled to bus 220 for communication with the other components of the ad preparation server 118.

The ad selection module 214 is software, code or routines for selecting an ad for delivery to the ad server 102. The ad selection module 214 is coupled to receive a request signal from the request processor 212 and coupled to retrieve ads from the advertising asset server 116. In some embodiments, the ad selection module 214 also monitors and executes campaigns for advertisers. In other words, the ad selection module 214 may control the placement, time, location of the delivery of the ads. The ad selection module 214 is responsible for retrieving the original advertisement from the advertising asset server 116. The ad selection module 214 delivers the retrieved original advertisement to the script injector 218. The ad selection module 214 is coupled by the bus 220 for communication with the advertising asset server 116, the request processor 212 and the script injector.

The script creation processor 216 is software, code or routines for creating a script for addition to an advertisement. Based upon the information that the advertiser wants collected, a script is created for addition to the advertisement. The script creation processor 216 creates a script to gather custom as well as standard information, for example, the data collection script 114. For example, the script creation processor 216 assigns the advertisement a unique identification number and includes that number in the script so that it can be used to report activity related to the advertisement back to the analytics server 104 and that activity can be associated with the specific ad in which this script is inserted. The script creation processor 216 also modifies the data collection script 114 so that it works properly with the advertisement. In other words, the operation of the data collection script 114 in collecting information and reporting back to the analytics server 104 is nonintrusive and does not interfere with the normal presentation of the content by the web page or the normal presentation of the advertisement. In one embodiment, the script creation processor 216 is coupled to the injected ad database 222 to receive script templates that can be used for creating specific instances of the data collection script 114. The script creation processor 216 is responsive to requests from the request processor 212 and provides created data collection scripts 114 to the script injector 218. The script creation processor 216 is coupled by the bus 220 for communication with the request processor 212, the injected ad database 222, and script injector 218.

The script injector 218 is software, code or routines for inserting data collection scripts 114 into advertisements. The script injector 218 receives an original ad from the ad selection module 214. The script injector 218 also receives a data collection script 114 from the script creation processor 216. The script injector 218 combines the original advertisement and the data collection script 114 into a new modified advertisement. The script injector 218 stores a copy of the new modified advertisement in the injected ad database 222. The original ad and data collection script 114 may also be stored in the injected ad database 222. In some embodiments, the script injector 218 also creates an association in the injected ad database 222 between the original ad, the modified ad and the particular data collection script 114. In one embodiment, the script injector 218 sends the modified ad to the ad server 104. In another embodiment, the script injector 218 since the modified ad to the request processor 212 which in turn provide the modified ad to the ad server 104. The script injector 218 is coupled to the bus 220 for communication with the other components 212, 214, 216, 218 and 222 of the ad preparation server 118.

The injected ad database 222 is a data store for storing information about ad that have been modified and data collection scripts 114 that have been added. In one embodiment the injected ad database is a conventional database. The injected ad database 222 stores the modified ad, the original ad, the injected script, and other information related to preparing the ad for delivery. In some embodiments, the injected ad database 222 is coupled to other systems such as the analytics server 104 to provide information about injected ads. The injected ad database 222 is coupled for communication with the other components 212, 214, 216, 218 and 222 of the ad preparation server 118.

Analytics Server 104

Figure 3:
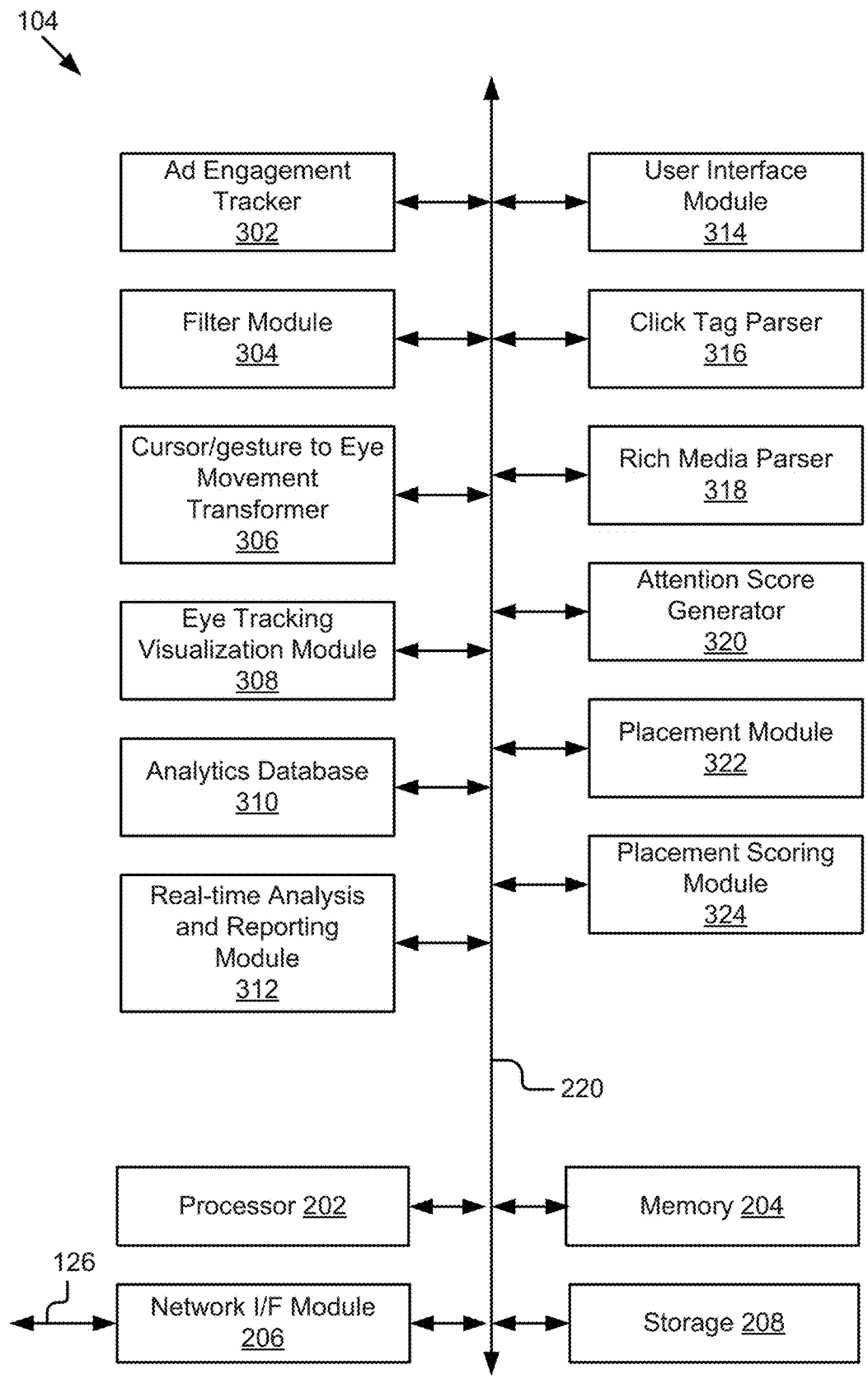
FIG. 3 is a block diagram illustrating an embodiment of an analytics server in accordance with the present invention.

Referring now to FIG. 3, the analytics server 104 will be described in more detail. The analytics server 104 comprises a processor 202, a memory 204, a network interface (I/F) module 206, storage 208, an ad engagement tracker 302, a filter module 304, a cursor/gesture to eye movement transformer 306, an eye tracking visualization module 308, an analytics database 310, a real-time analysis and reporting module 312, a user interface module 314, a click tag parser 316, a rich media parser 318, an attention score generator 320, a placement module 322 and a placement scoring module 324. These components are communicatively coupled to each other by bus 220 for sending and receiving information.

The processor 202, the memory 204, the network interface (I/F) module 206, the storage 208 and bus 220 have the same or similar functionality to that described above with reference to FIG. 2, so that description will not be repeated here. It should be noted, however, that the network interface module 206 is coupled by signal line 126 to the network 106 and to the bus 220.

The ad engagement tracker 302 is software, code or routines for collecting information about advertisements from the data collection scripts 114. The ad engagement tracker 302 is coupled by the network 106 to numerous client devices 108 and thus numerous data collection scripts 114. Each of these data collection scripts 114 sends ad information or analytics data to the analytics server 104 and this ad information or analytics data is collected and captured by the ad engagement tracker 302. For example, the ad engagement tracker 302 collects ad information such as the ID of the ad, the domain on which the ad was presented, the placement of the ad on the page, user inputs while the ad was being displayed, browser information, or information about the entity that served the ad. In some embodiments, the ad engagement tracker 302 sends the ad information to the analytics database 310 for storage and the real-time analysis and reporting module 312 for immediate processing. The ad engagement tracker 302 is coupled to the bus 220 for communication with the other components of the analytics server 104, in particular the analytics database 310 and a real-time analysis and reporting module 312.

The filter module 304 is software, code or routines for processing ad information or analytics data including click tag analysis, rich media analysis and other analysis. The filter module 304 is coupled to the analytics database 310 to retrieve ad information or analytics data and perform click tag analysis and rich media analysis. In one embodiment, the filter module 304a processes the analytics data to produce signals that are used by the cursor/gesture to eye movement transformer 306. In some embodiments, the filter module 304b also processes analytics data from the real-time analysis and reporting module 312 in a real-time manner (See also FIG. 4). The filter module 304 is coupled by the bus 220 for communication with the other components of the analytics server 104, in particular the analytics database 310, the cursor/gesture to eye movement transformer 306, and the real-time analysis and reporting module 312.

The cursor/gesture to eye movement transformer 306 is software, code or routines for translating the filtered analytics data into eye movement information. One embodiment of the operations of the cursor/gesture to eye movement transformer 306 is described in more detail below with reference to FIG. 11. The cursor/gesture to eye movement transformer 306 is coupled to the bus 220 to receive the filtered analytics data from the filter module 304, processes that information to produce eye movement information, and provides the eye movement information to the eye tracking visualization module 308. In some embodiments, the eye to cursor/gesture movement transformer 306b operates on a set of real-time filtered analytics data (see FIG. 4). While the present invention is described primarily below in the context of cursor movement, it should be understood that gestures and any other type of user input can be use instead of or in combination with cursor movement. Moreover, cursor data, gesture data and other user input are referred to in this application as input data.

Figure 20:
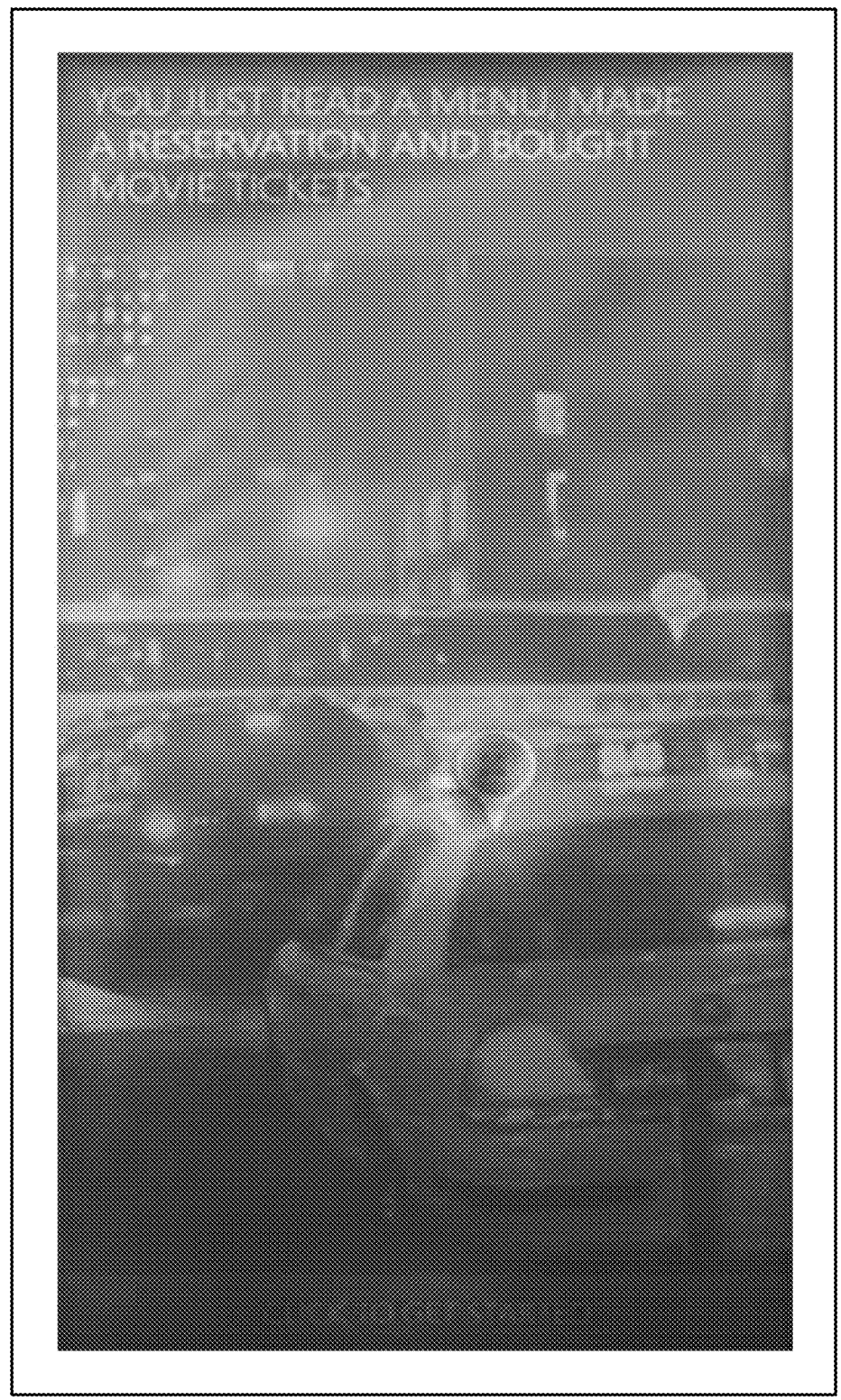
FIG. 20 is a graphic representation of an embodiment of a user interface for presenting a visual image, heat map, in accordance with the present invention.

The eye tracking visualization module 308 is software, code or routines for producing a visual image that represents the eye movements of the user relative to the advertisement. These eye movements are indicia of the user's focus of attention relative to the entire web page. One embodiment for operation of the eye tracking visualization module 308 is described below with reference to FIG. 12. The eye tracking visualization module 308 is coupled to the bus 220 for receiving eye movement information from the cursor/gesture to eye movement transformer 306 and providing a visual image to the user interface module 314. One example of a user interface including a visual image generated eye tracking visualization module 308 is shown in FIG. 20.

The analytics database 310 is a data store for storing information received by the analytics server as well as data generated during intermediate processes. The analytics database 310 is a database of a conventional type. The analytics database 310 is coupled to the bus 220 for storage and retrieval of information by different components of the analytics server 104.

The real-time analysis and reporting module 312 is software, code or routines for immediate processing of ad information and analytics data from the ad engagement tracker 302. The real-time analysis and reporting module 312 is coupled to provide data immediately to the filter module 304 and the attention score generator 320. The real-time analysis and reporting module 312 allows smaller segments of data to be processed immediately and sent to the user interface 314. The real-time analysis and reporting module 312 is coupled to the bus 220 for communication with the other components of the analytics server 104.

In some embodiments, the real-time analysis and reporting module 312 is coupled to receive conditions or request for advertising analytics from other systems, e.g. advertiser systems (not shown). The real-time analysis and reporting module 312 receives those conditions, monitors for satisfaction of those conditions, and if they occur sends a signal or beacon to the advertiser systems indicating a satisfied condition or the requested the information. For example, the real-time analysis and reporting module 312 can receive a request from an advertiser system to be notified of a condition such a placement of an ad, or even more particularly cursor over or gesture over an ad by a user. The data collection scripts of the present invention monitor user behavior and report events to the analytics server 104. The real-time analysis and reporting module 312 in turn sends this information to the advertiser system. Thus, the analytics server 104 receives a condition from an advertiser system, captures analytics data from using a data collection script; analyzes the captured analytics data to determine whether the condition was satisfied; and generates and sends a signal if the condition was satisfied. The real-time analysis and reporting module 312 can perform some or all of these steps in real time. The real-time analysis and reporting module 312 can modify the signal or beacon sent to the advertiser to include any analytics data such as but not limited to the ad, the ad identifier, time, web page, action, event, browser, placement position, focus index, attention score, etc. This is particularly advantageous because the advertiser systems can use these signals from the real-time analysis and reporting module 312 to optimize ad campaigns while they are running such as automatically adjusting bid prices for ads, ad placement locations, etc.

The user interface module 314 is software, code or routines for presenting advertising analytics information to the user and receiving and processing inputs about that advertising analytics information. For example, the user interface module 314 receives input from the user about specific advertising analytic parameters of interest. The user interface module 314 in response to that user input generates reports, graphics and other information by communicating with the other components of the analytics server 104 and those reports, graphics and other information are provided for display. The user interface module 314 is coupled by the bus 220 for communication with the eye tracking visualization module 308, the attention score generator 320, and the real-time analysis and reporting module 312. The user interface 314 is also coupled by the bus a network interface module 206 to the client device 108 that displays the reports and other information.

The click tag parser 316 is software, code or routines for processing ad information or analytics data stored in the analytics database 310 by the ad engagement tracker 302. In particular, the click tag parser 316 processes click tag information to generate data parameters that are used by the filter module 304 for click tag analysis. In one embodiment, the click tag parser 316 process the click tag to get an approximation about the page which the user would land if the ad were clicked upon. The click tag parser 316 extracts parameters from the click tag and uses them in generating that approximation. For example, in one embodiment, the click tag parser 316 pulls out the series of URLs in the click tag, determines the last URL in the series, and assumes the user will end up at that URL. The click tag parser 316 is coupled by the bus 220 to retrieve and store information in the analytics database 310.

The rich media parser 318 is software, code or routines for processing ad information and analytics data stored in the analytics database 310 by the ad engagement tracker 302. Similar to the click tag parser 316 but for rich media, the rich media parser 318 processes the rich media information to generate data and parameters that used by the filter module 304 for rich media analysis. Such rich media information includes ad expansion, ad collapse, add duration, etc. The rich media parser 318 is coupled by the bus 220 to receive information from and store information to the analytics database 310.

The attention score generator 320 is software, code or routines for generating an attention score. The attention score generator 320 processes the analytics data and information in the analytics database 310 to generate the attention score. In one embodiment, the attention score is a composite score of several parameters of advertising data including but not limited to a visualization metric, a placement score, a views metric, a share metric, a velocity, a focal index, and activity index, an engagement rate, etc. The attention score generator 320 is coupled by the bus 220 to the analytics database 310 to retrieve the information necessary to produce the attention score. The score generator 20 is also coupled by bus 220 to provide the attention score to the user interface module 314.

The placement module 322 is software, code or routines for determining the placement of a particular advertisement. The placement module 322 is coupled to retrieve information from the analytics database 310 necessary to determine the placement of an advertisement. The placement module 322 determines not only the domain or website with which the advertisement was delivered, but also the location on the web page delivered. The placement module 322 is coupled to retrieve information from the analytics database 310. The placement module 322 stores placement information back to the analytics database 310, and in some embodiments provide to the placement scoring module 324.

The placement scoring module 324 is software, code or routines for generating a score representative of the value of placement of an advertisement at a particular position on a specific web page. The placement score advantageously informs publishers which locations on particular web pages are valuable. The placement score is calculated by applying a function to factors including ad position, web page, attention score and the parameters used to calculate it, engagement rate, etc. The placement scoring module 324 is coupled to receive placement information from the placement module 322 or the analytics database 310. From the placement information, the placement scoring module 324 generates the placement score and stores it in the analytics database 310 or provides it to the attention score generator 320.

Figure 4:
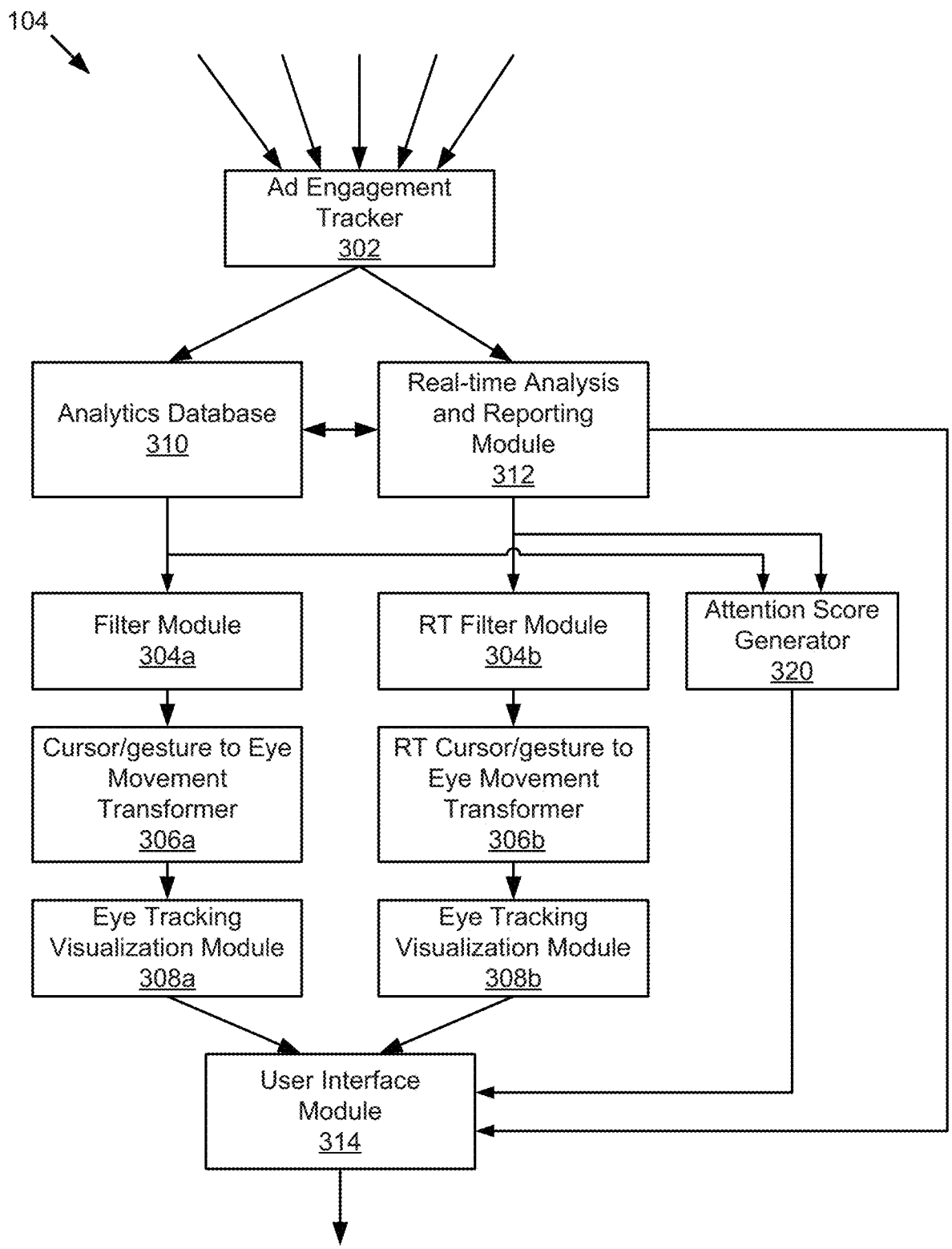
FIG. 4 is a block diagram illustrating one embodiment of data flow in the analytics server in accordance with the present invention.

Referring now also to FIG. 4, the data flow through the analytics server 104 is described. The raw data is received from the data collection scripts 114 by the ad engagement tracker 302. The ad engagement tracker 302 stores the information in the analytics database 310 and also provides it to the real-time analysis and reporting module 312. The real-time analysis and reporting module 312 and the analytics database 310 also communicate with each other to share information. The analytics database 310 provides information to a first processing pipeline including the filter module 304a, the cursor/gesture to eye movement transformer 306a, and the eye tracking visualization module 308a. This first pipeline processes the raw data to produce a visual image of the user's attention that is provided to the user interface module 314. This first pipeline process includes a complete analysis of the data to produce the visual image. The real-time analysis and reporting module 312 provides a more limited set of data to a second pipeline including the real-time filter module 304b, the real-time cursor/gesture to eye movement transformer 306b, and the eye tracking visualization module 308b. The second pipeline processes the raw data and produces a visual image of the user's attention that is also provided to the user interface module 314. Since the second pipeline has a more limited set of data, it can produce the image more quickly; however, the visual image may not be as accurate as that produced by the first pipeline. The analytics database 310 and the real-time and porting module 312 also provide information to the attention score generator 320. The attention score generator 320 processes the received information and produces an attention score that is delivered to the user interface module 314 for presentation to the user. Finally, the real-time analysis and reporting module 312 also provides information for example tabular statistics to the user interface 314 for presentation to the user. As shown in FIG. 4, this dataflow allows the user interface module 314 to provide a unified view with the necessary advertising metrics such that advertisers can make better decisions about ad placement and effectiveness.

Ad Search Engine 132

Figure 5:
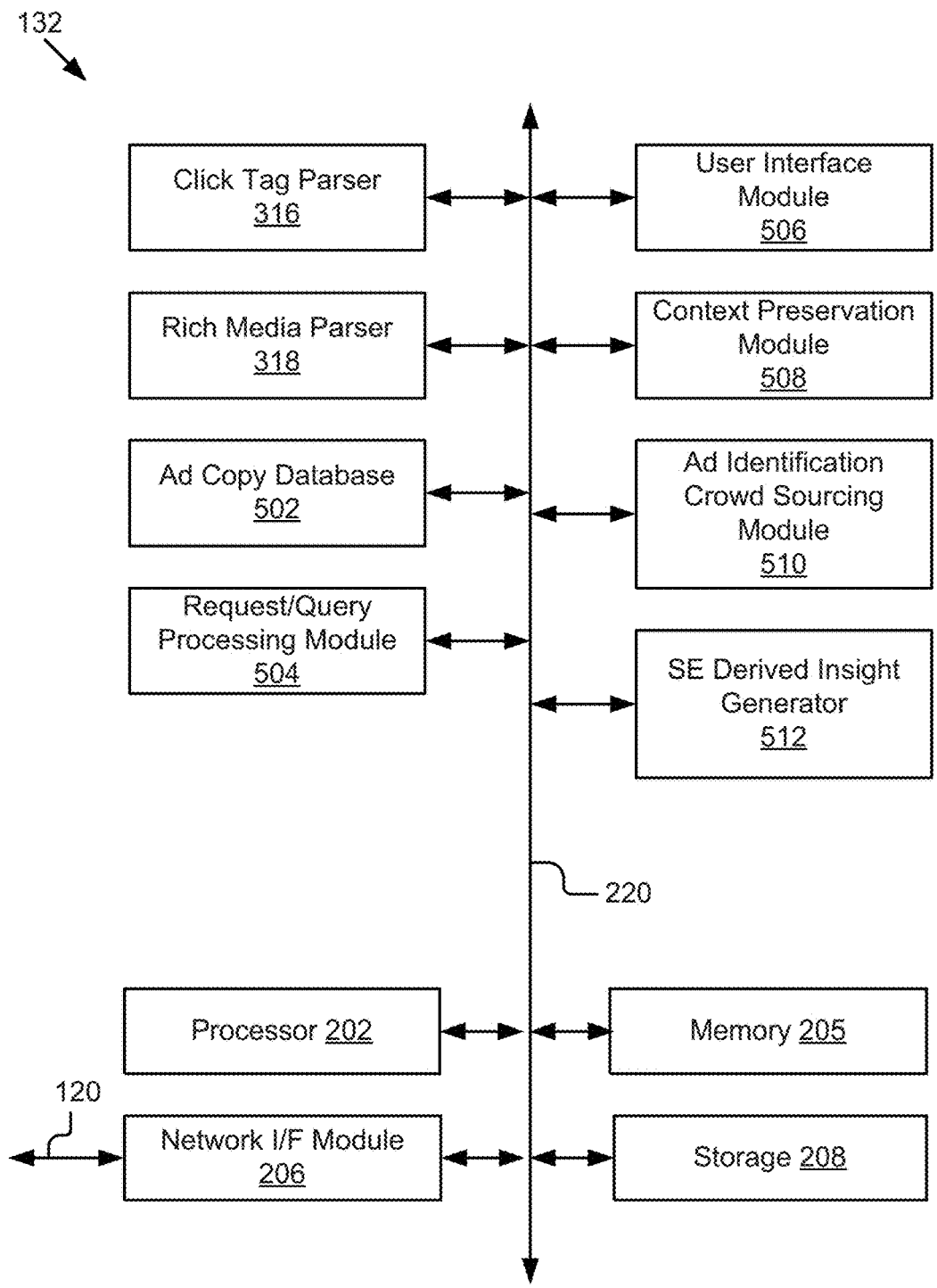
FIG. 5 is a block diagram illustrating an embodiment of an ad search engine in accordance with the present invention.

FIG. 5 is a block diagram of one embodiment of the ad search engine 132. In this embodiment, the ad search engine 132 comprises: a processor 202, a memory 204, a network interface (I/F) module 206, storage 208, a bus 220, a click tag parser 316, a rich media parser 318, an ad copy database 502, a request/query processing module 504, a user interface module 506, a content preservation module 508, an ad identification crowd sourcing module 510, and a search engine (SE) derived insight generator 512.

The processor 202, the memory 204, the network interface (I/F) module 206, the storage 208, the bus, the click tag parser 316 and the rich media parser 318 have the same or similar functionality to that described above with reference to FIGS. 2 and 3, so that description will not be repeated here. It should be noted, however, that the network interface module 206 is coupled by signal line 134 to the network 106 and to the bus 220. It should also be noted that the click tag parser 316 and the rich media parser 318 process the information received from the data collection script 114 but in a manner different than that described above with reference to FIG. 3. The click tag parser 316 and the rich media parser 318 process the advertising information or analytics data for research purposes as opposed to for evaluation as in the analytics server 104.

The ad copy database 502 is a data store for information from the click tag parsers 316, the rich media parser 318, and the content preservation module 508. In one embodiment, the ad copy database 502 stores the original ad content as well as enough information to render the ad in the same context as the one in which it was presented to the user. In some embodiments, the ad copy database 502 also stores ad impression data, creative records, and other metadata. This advantageously allows the ad search engine 132 to reproduce the advertisement for later review by advertisers and marketing personnel. The ad copy database 502 is a database of a conventional type. The analytics database 310 is coupled to the bus 220 for storage and retrieval of information by different components of the ad search engine 132.

The request/query processing module 504 is software, code or routines for receiving queries, performing searches of the ad copy database 502 and returning results. The request/query processing module 504 is coupled to the user interface module 506 to receive query terms input by the user. The request/query processing module 504 uses those terms to formulate a query and apply the query to the ad copy database 502. The results from the query are then processed and formatted and then sent to the user interface module 506 for delivery to the user. One method for operating the request/query processing module 504 is described below with reference to FIG. 9. The request/query processing module 504 is coupled to the bus for communication with the other components of the ad search engine 132 including the user interface module 506 and the ad copy database 502.

The user interface module 506 is software, code or routines for providing presenting a search interface to users, receiving input and search queries, and outputting results. The operation of the user interface module 506 is described in more detail below with reference to FIGS. 9, 13A, 13B, and 17-19. The user interface module 506 is coupled by the bus 220 for communication with the request/query processing module 504 and the network interface module 206 for communication with client devices 108.

The content preservation module 508 is software, code or routines for capturing the context in which ads were presented to the user. The context preservation module 508 receives context information and stores it in the ad copy database 502 so that the presentation of those advertisers can be rendered upon requests to the ad search engine 132. One embodiment for the operation of the content preservation module 508 is described in more detail below with reference to FIGS. 15A and 15B. The content preservation module 508 is coupled to the bus 220 to receive or retrieved information about ad context from the analytics server 104 and store requisite information in the ad copy database 502.

The ad identification crowd sourcing module 510 is software, code or routines for generating and storing identification information about ads. The ad identification crowd sourcing module 510 is adapted to send relevant information about advertisements that has been extracted from the ad copy database 508 to users. The users in turn identify the ad and associated information and send that information back to the crowd sourcing module 510. In one embodiment, the users identify the brand, sponsor, company etc. associated with the advertisement. The ad identification crowd sourcing module 510 is coupled via the bus 220 and the network interface module 206 to present unidentified ads to users. The ad identification crowd sourcing module 510 receives the identification information from the user and stores that information into the ad copy database 502. In some embodiments, the ad identification crowd sourcing module 510 may send a particular ad to multiple users and use the identifying information provided by the majority of crowd source users.

The search engine (SE) derived insight generator 512 is software, code or routines for generating a derived insight score for advertisement. The operation of the search engine derived insight generator 512 is described in more detail below with reference to FIG. 16. The derived insight score is an inferred value of an ad (e.g., how well an ad performs.) For example, the search engine derived insight generator 512 can probe the internet and ad servers to obtain leaked insights about ad performance such as the best performing ads or whether there are a lot of dollars being spent on a particular ad. This information is used to generate the derived insight score. The search engine derived insight generator 512 provides that derives insight score to the ad search engine 132, used when ranking or presenting results or user interface module 506 for presentation to the user. The search engine derived insight generator 512 is coupled to receive information from the ad copy database 502.

Figure 6:
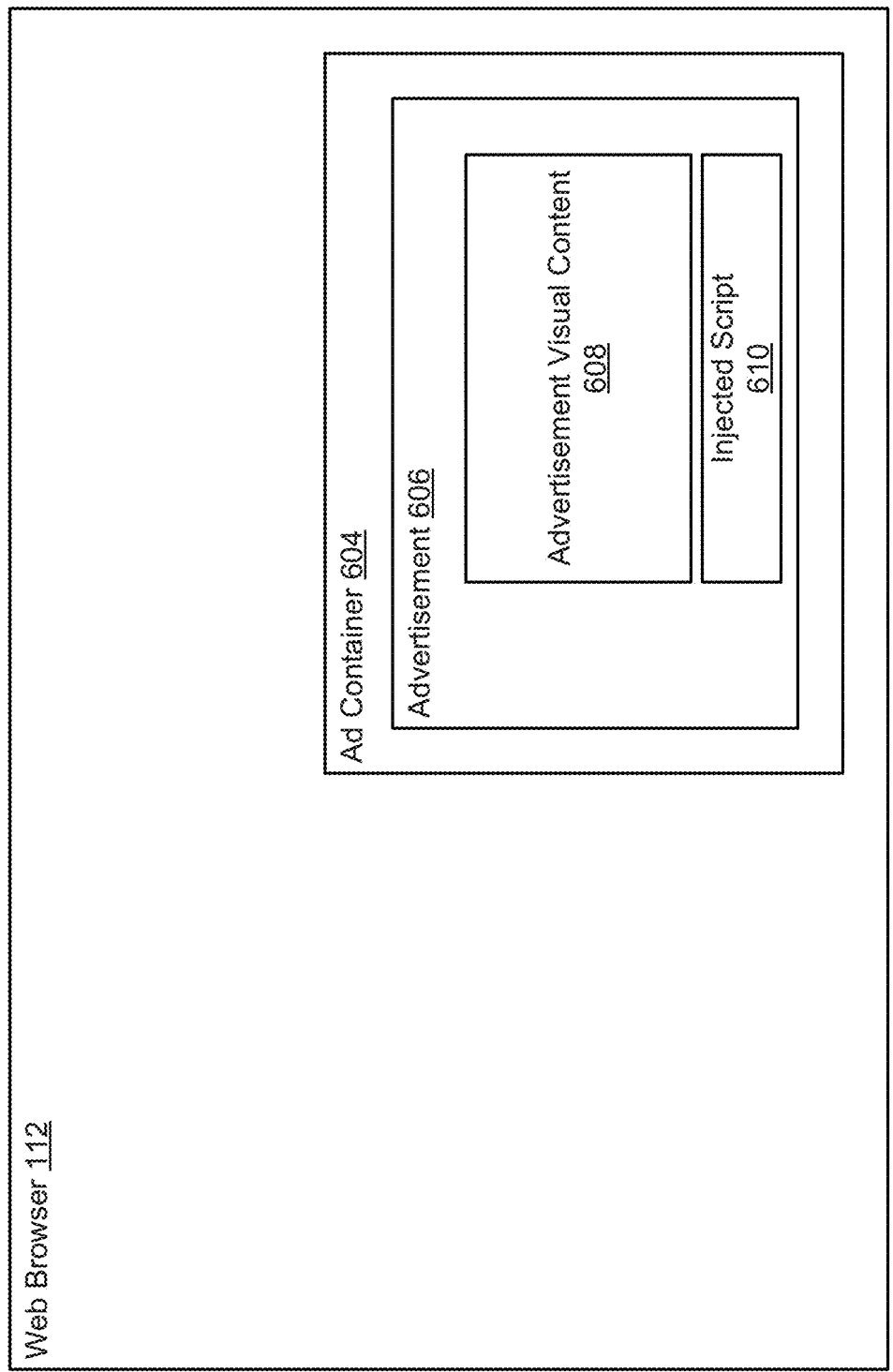
FIG. 6 is a block diagram illustrating an embodiment of a web browser and components using in advertising in accordance with the present invention.

Referring now to FIG. 6, an embodiment of a web browser 112 and components used in the advertising system 100 in accordance with the present invention are shown. FIG. 6 shows the web browser 602 similar to that in FIG. 1 that is operable on the client device 108. The web browser 112 is of a conventional type such as Internet Explorer provided by Microsoft Corporation, Firefox provided by Mozilla Foundation or Safari provided by Apple Computer Inc. In accordance with the present invention, ads are delivered for presentation by the web browser 112. The ads are delivered to the client device 108 in the form of an ad container 604 that is a software object or container including code executable by the web browser 112. The ad container 604 of the present invention advantageously includes an advertisement 606 that includes the advertising visual content 608 and an injected script 610. In one embodiment, the ad container 604 is one or more iframes executing the advertisement 606, presenting the advertisement visual content 606 and executing the injected script 610. The injected script 610 is synonymous with the data collection script 114 of FIG. 1. The present invention is particularly advantageous because the web browser 112 processes the ad container 604 and the advertisement 606 in a conventional manner as existing ad containers. However, the advertisement 606 constructed in accordance with the present invention includes both the advertising visual content 608 and the injected script 610. The injected script 610 cooperates with the web browser 112 to capture information about the presentation of the advertising visual content 608, and the injected script 610 non-intrusively sends the captured information to the analytics server 104.

Methods

Figure 7:
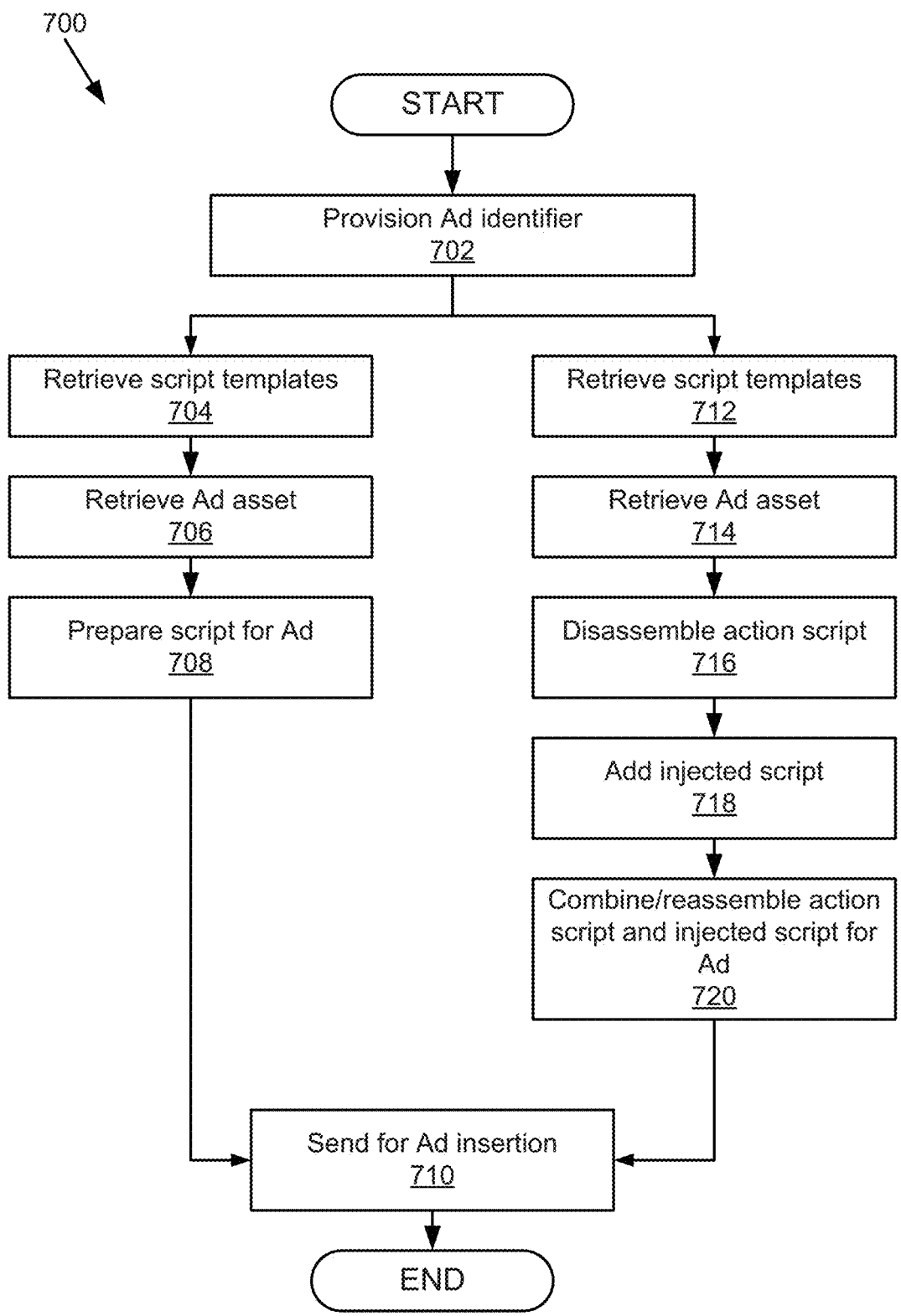
FIG. 7 is a flowchart of one embodiment of a method for preparing ads in accordance with the present invention.

Referring now to FIG. 7, one embodiment of a method 700 for preparing ads it will be described. The method 700 begins by provisioning 702 an ad identifier. In other words, the ad preparation server 118 assigns a unique identification number or identifier to an ad that is about to be served. This unique identifier is used to associate any information reported by the data collection script 114 to the analytics server 104 with this particular ad. The method 700 continues by determining the types of scripts included in the ad and processing the scripts to add the data collection script 114 and create a modified ad. If JavaScript is included in the ad then it is processed with steps 704-708 of the method 700. If action script is included in the ad then the ad is processed with steps 712-720 of the method 700.

For those ads including only JavaScript, the method 700 retrieves 704 scripts to the JavaScript for the advertisement. For example, the script creation processor 216 can retrieve the script template from the injected ad database 222 or the storage holding the script templates. The method 700 then retrieves 706 the ad asset. For example the script creation processor 216 can retrieve the ad asset from the advertising asset server 116. Next the data collection script 114 for the ad is created 708 by adding a script template and added to the modified ad. The method 700 completes by sending 710 the ad to the ad server 102 for insertion.

For those ads including action script, the method 700 retrieves 712 the script templates from storage. Next, the method 700 retrieves 714 the ad asset from the advertising asset server 116. The method 700 then disassembles 716 the action script. The method 700 then adds 718 the injected script. The original action script and the injected script are combined or reassembled 722 to create a modified ad. In some embodiments, the modified ad is also validated to ensure proper operation. The method 700 then completes by sending 710 the ad to the ad server 102 for insertion.

The present invention is particularly advantageous because this process for preparing the modified ad ensures that the modified as will execute in the same manner as the original ad without any impact of the injected script. Furthermore, the present invention advantageously provides injected script that non-intrusively sends data to the analytics server 104. Furthermore, the process described with reference to FIG. 7 can't be completed can be performed in fractions a second, thereby allowing the ad preparation to be performed in real-time on-the-fly.

Figure 8:
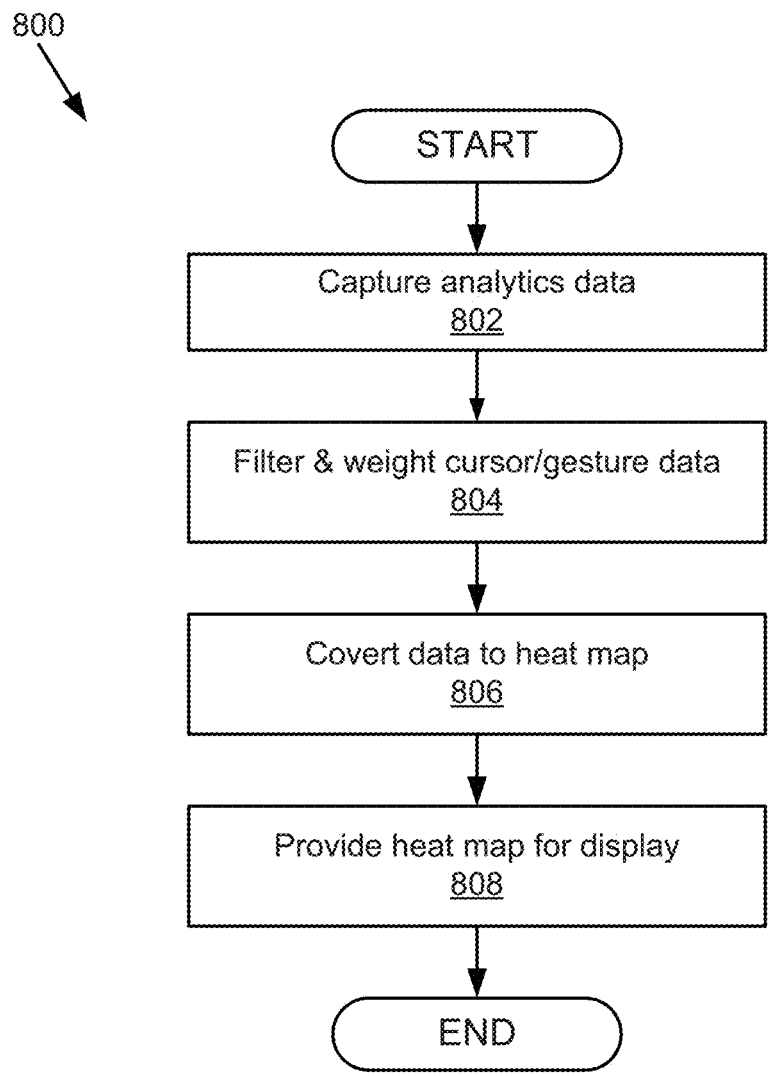
FIG. 8 is a flowchart of one embodiment of a method for deriving a heat map in accordance with the present invention.

Referring now to FIG. 8, one embodiment of a method 800 for deriving a heat map in accordance with the present invention. This general method 800 for deriving a heat map begins by capturing 802 analytics data. As noted above, this is accomplished by adding data collection script to advertisements before they are served. Once they are served along with content, they generate data that is sent from client devices 108 to an analytics server 104. Next the captured analytics data is filtered 804 and weighted. For example, the analytics, in particular the cursor or gesture data, data may be filtered and weighted as described above by the filter module 304 The method 800 continues by converting 806 the cursor or gesture data to a visual image. For example, the visual image may be a heat map wear different colors on the heat map represent different levels of focus of the user. In one embodiment, the individual image is produced by the cursor/gesture to eye movement transformer 306 and the eye tracking visualization module 308. The method 800 completes by providing 808 the visual image for display. For example, the user interface module 314 sends the heat map to a client device for presentation in the browser 112.

Figure 9:
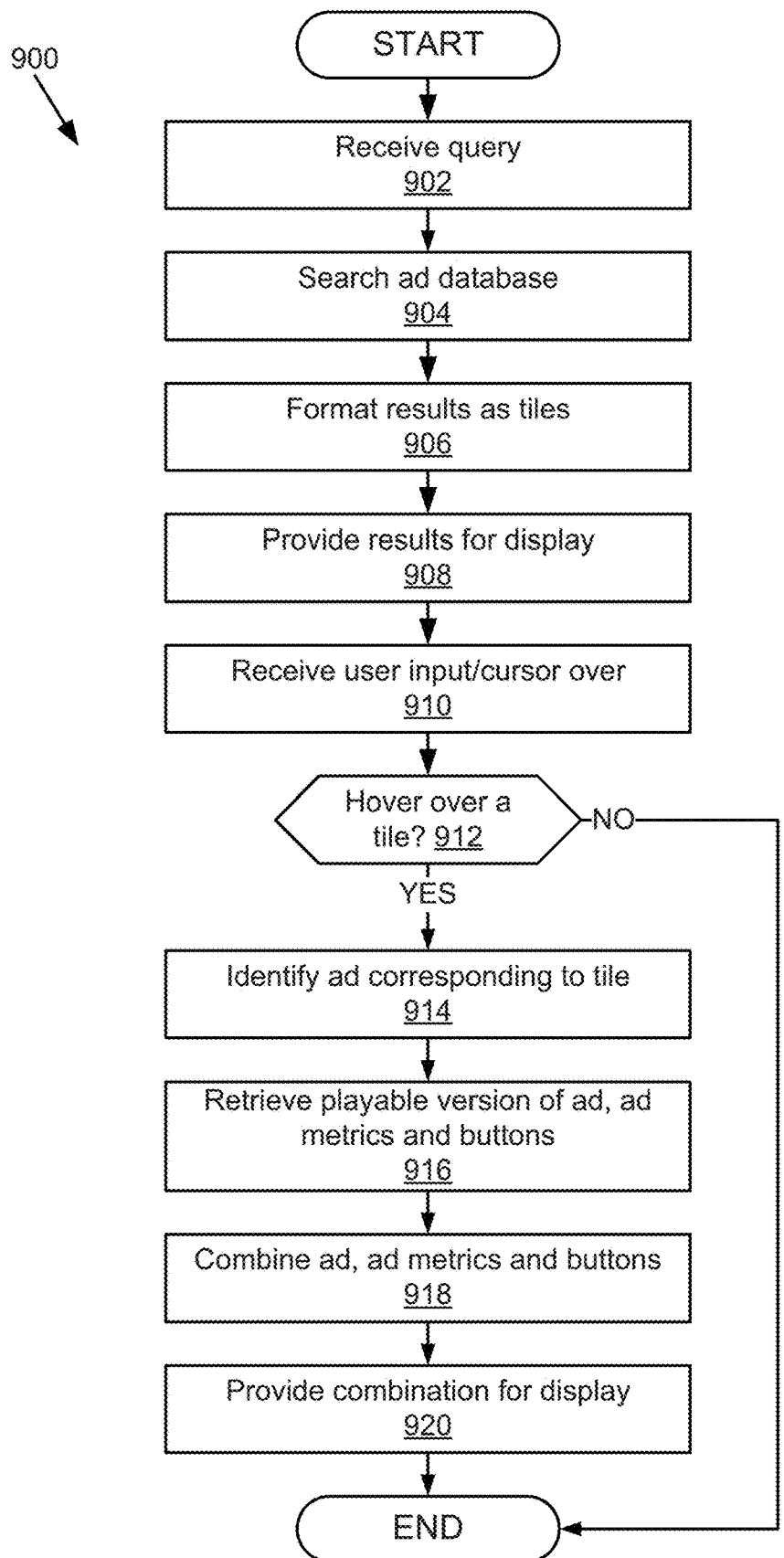
FIG. 9 is a flowchart of one embodiment of a method for displaying ad search results in accordance with the present invention.
Figure 17:
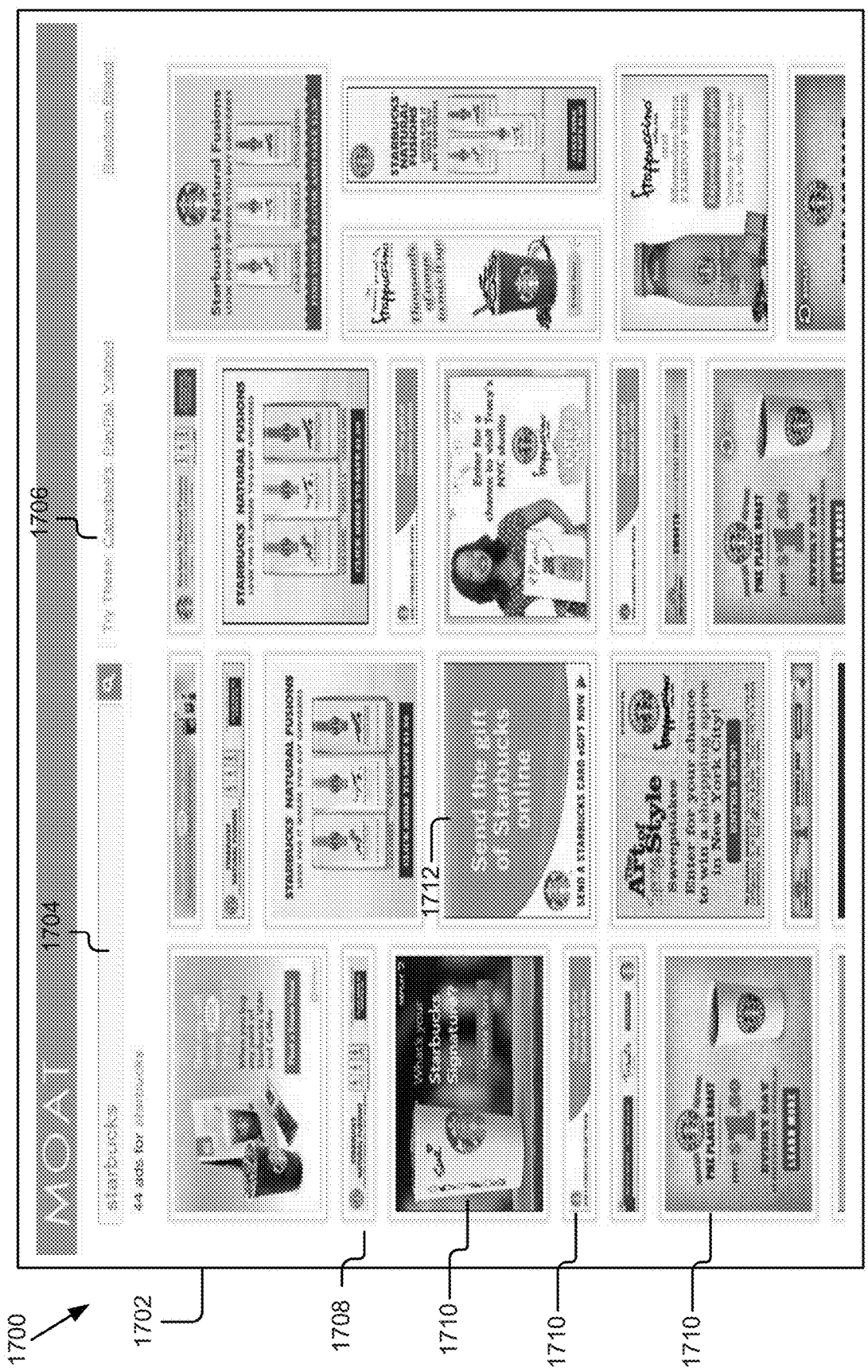
FIG. 17 is a graphic representation of an embodiment of a user interface for showing advertisement search results in accordance with the present invention.
Figure 18:
FIGS. 18 and 19 are graphic representations of embodiments of user interfaces for presenting advertisement metadata in accordance with the present invention.
Figure 19:
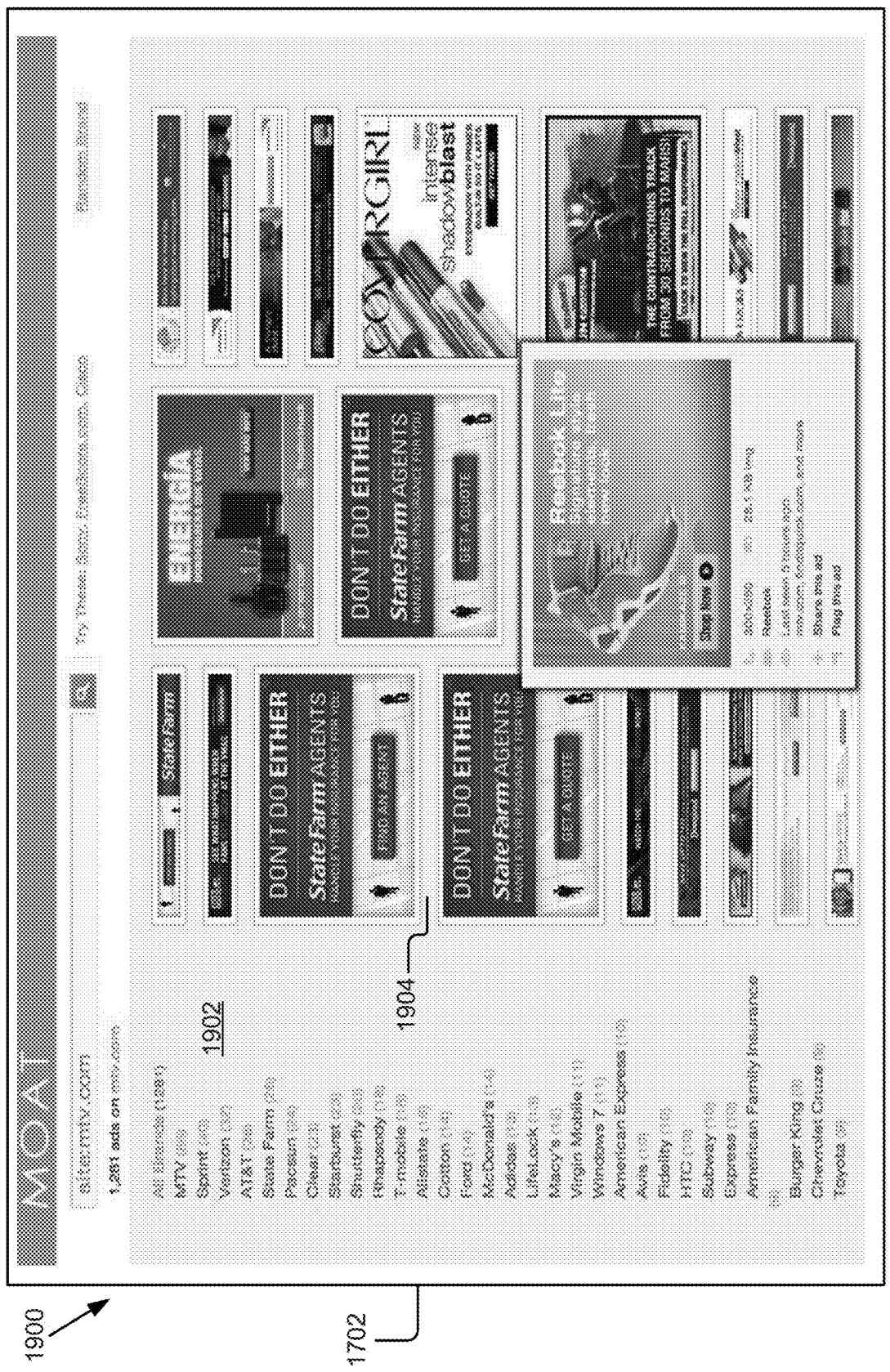

Referring now to FIG. 9, one embodiment of a method 900 for displaying ad search results in accordance with the present invention will be described. The method 900 begins by receiving 902 a query from a client device 108 at the ad search engine 132. The query is received and processed by the request/query processing module 504. The query is used to perform a search 904 of the ad copy database 502. The results are returned to the request query processing module 504 which formats 906 the results as tiles. One example of such formatted results is shown in FIG. 17. In some embodiments, the user interface module 506 is responsible for formatting the query results as tiles. The user interface module 506 then sends the formatted tiles to the client device 108 for display to the user 110. The user 110 can interact with the tiles and input commands, make selections, or gesture or cursor over different tiles. The client device 108 sends any input from the user 110 and it is received 910 by the ad search engine 132. The method 900 determines 912 whether the input was a hover over a particular tile. If not, the method 900 is complete and ends. In other embodiments, the method 900 loops to step 910 until the user closes the browser window 112. On the other hand, if the method 900 determined 912 that the user input was a cursor or gesture over a tile, the method 900 identifies 914 the ad corresponding to the tile. Then the ad corresponding to the tile is retrieved 916 from the ad copy database 502. For example, a playable version of the ad, ad metrics and associated buttons are retrieved from the ad copy database 502. The retrieved ad is then combined 918 with ad metrics and buttons into a script executable by the web browser 112. The method 900 concludes by providing 920 the combination (e.g., the executable script) to the client device 108 for display of the ad. Examples of such ads produced by executing the script are shown in FIGS. 18 and 19 and described below.

Figure 10:
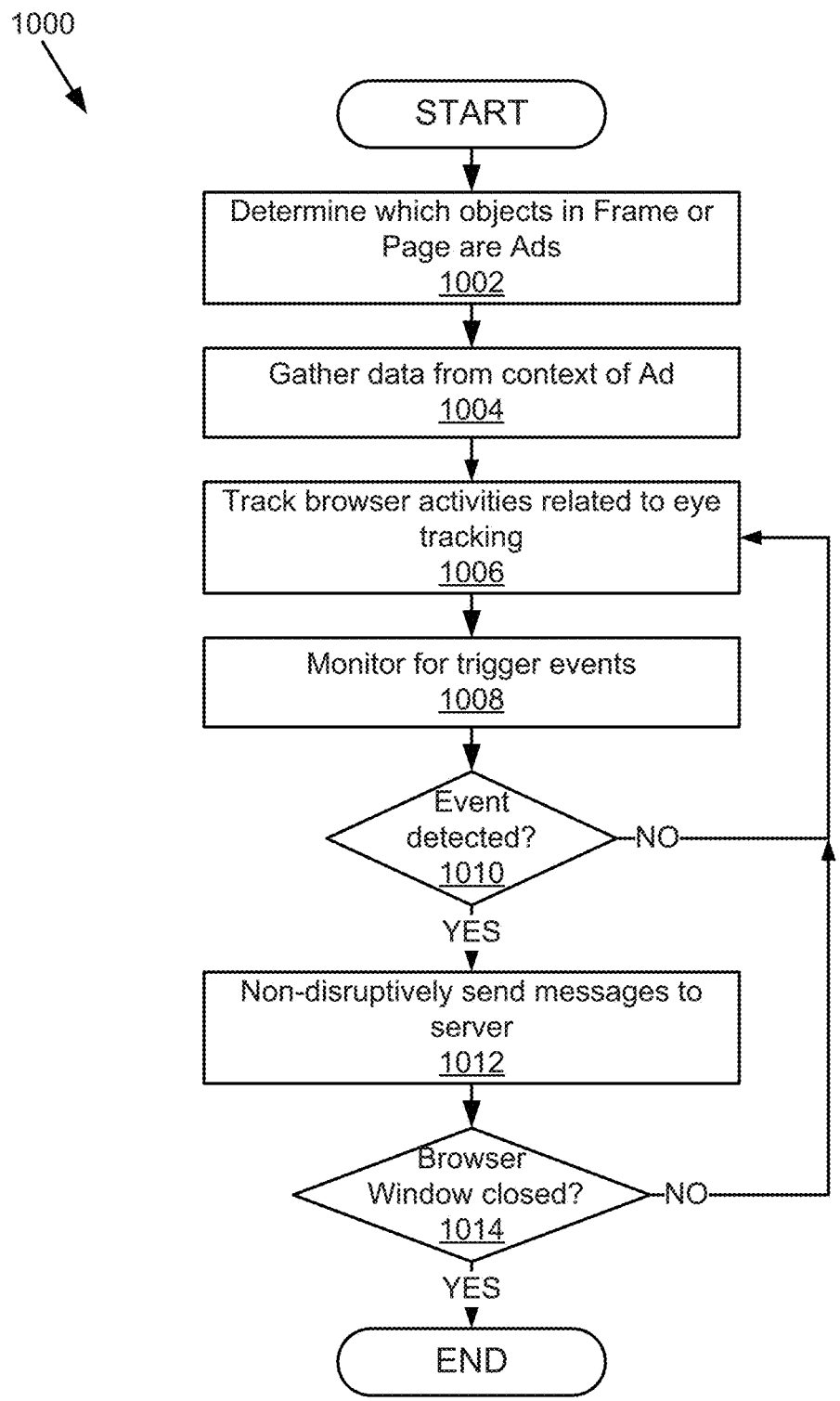
FIG. 10 is a flowchart of one embodiment of a method for generating and sending advertising data in accordance with the present invention.

Referring now to FIG. 10, one embodiment of a method 1000 for generating and sending advertising data in accordance with the present invention will be described. FIG. 10 shows one embodiment for the method 1000 performed by the data collection script 114 or the injected script. The method 1000 begins by determining 1002 which objects are ads in the frame or page in which the data collection script 114 is executing. Then the method 1000 gathers 1004 data from the context of the ad. For example, the method 1000 determines the ad identifier, the publisher or website and other information. In essence, the method 1000 gathers a data snapshot of the context in which the ad is being presented. The method 1000 continues by tracking 1006 browser activities of the user related to eye tracking. For example, cursor or gesture movements, click inputs or scroll inputs are track tracked and temporarily stored. The method 1000 also monitors 1008 for trigger events. For example, trigger events include but are not limited to execution of certain events by the web browser 112 such as the loading of an ad, a cursor or gesture being moved over an ad, and ad being clicked upon, certain custom events, and other events. Next the method 1000 determines 1010 whether a trigger event has been detected. If not, the method 1000 returns to step 1006 and continues to track browser activities and monitor for trigger events. On the other hand if a trigger event was detected in step 1010, the method 1000 continues to non-intrusively send 1012 messages from the client device 108 to the analytics server 104. The messages include the track browser activities and trigger events. The messages are sent "non-intrusively" in that it is virtually impossible for the normal users to tell this information is being sent from the client device 108 to the analytics server 104. In one embodiment, the messages are non-intrusively sent by using XML sockets or server call methods. After the method 1000 has nondestructively sent the messages to the analytics server 104, the method 1000 determines 1014 whether the browser window has been closed. If not, the method 1000 returns to step 1006 to continue and continues to track browser activities and monitor for trigger events. However, if the browser window has been closed, the method 1000 is complete and ends. From the above method 1000, it should be understood that the data collection script 114 or the injected script is particularly advantageous because: 1) the information about user interaction with the ad is sent non-intrusively from the client device 108 to the analytics server 104; 2) the information about user interaction is sent in multiple small messages after each trigger event thereby providing real-time data; 3) the information about user interaction is sent in multiple small messages thereby making the tracking unnoticeable to the user.

Figure 11:
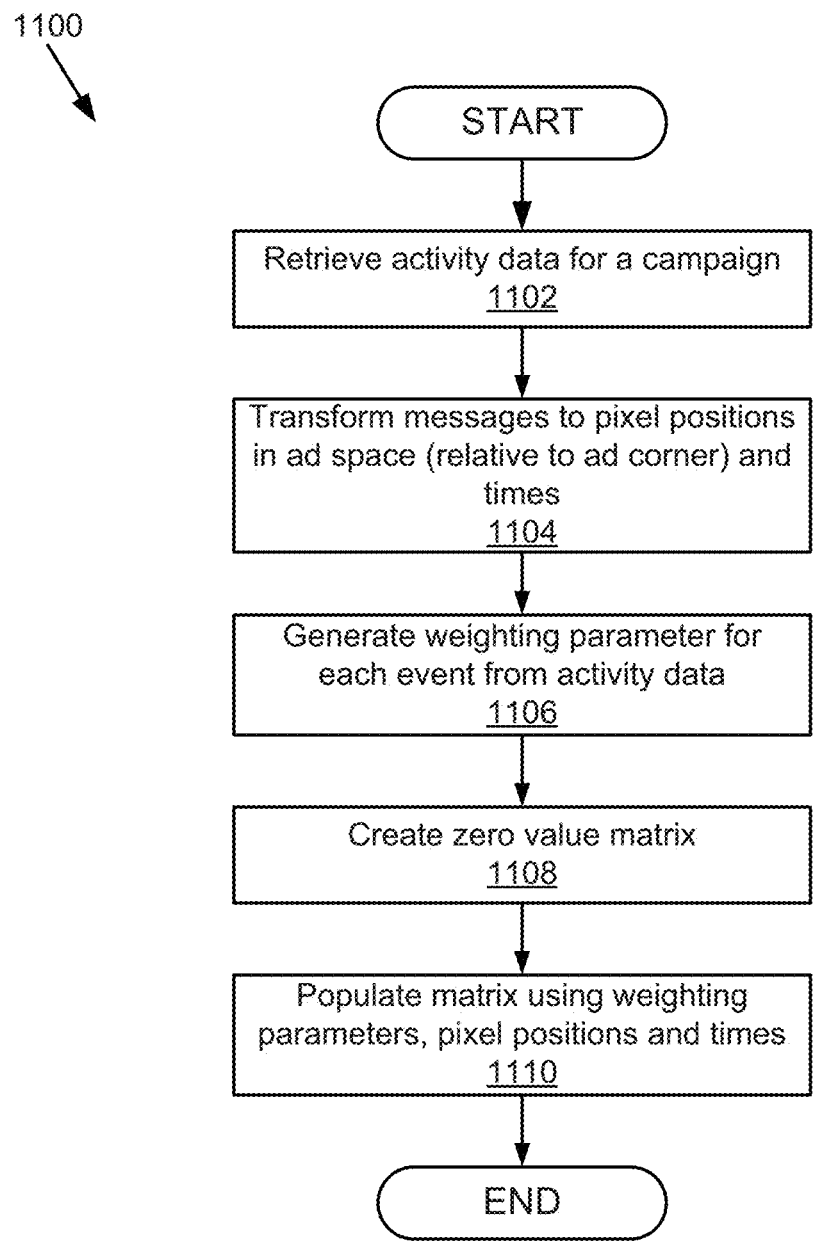
FIG. 11 is a flowchart of one embodiment of a method for generating a representation of a focus of attention for a user in accordance with the present invention.

Referring now to FIG. 11, one embodiment of a method 1100 for generating a representation of a focus of attention for user will be described. In this embodiment, the method 1100 uses eye tracking as indicia for the user's focus attention. The method 1100 begins by retrieving 1102 activity data from the analytics database 310 for a campaign. In one embodiment, the method 1100 retrieves data about users activity provided by the data collection scripts 114 related to a particular ad campaign. In some embodiments, the messages provided by the data collection script and stored in the analytics database 310 are processed hundreds of times so that the data from a particular campaign is retrieved. Next the method 1100 transforms 1104 the messages from the analytics database 310 to pixel positions in ad space and time. In one embodiment, the transformation is relative to the upper left corner of the ad. In another embodiment, the method 1100 transforms user messages containing client environment variables to positions in pixels relative to a corner of an ad and to times relative to the start of a notable event of importance to the ad. The method 1100 continues by generating 1106 a weighting parameter for each event from the activity data. Then the method 1100 creates 1108 a zero value matrix, and populates 1110 the matrix using weighting parameters, pixel positions and times. In one embodiment, the method 1100 builds a heat map data structure by adding the transformed user activity data to values in an initially zero value matrix corresponding to the weighting parameters with keys corresponding to time and pixel coordinates of an ad.

Figure 12:
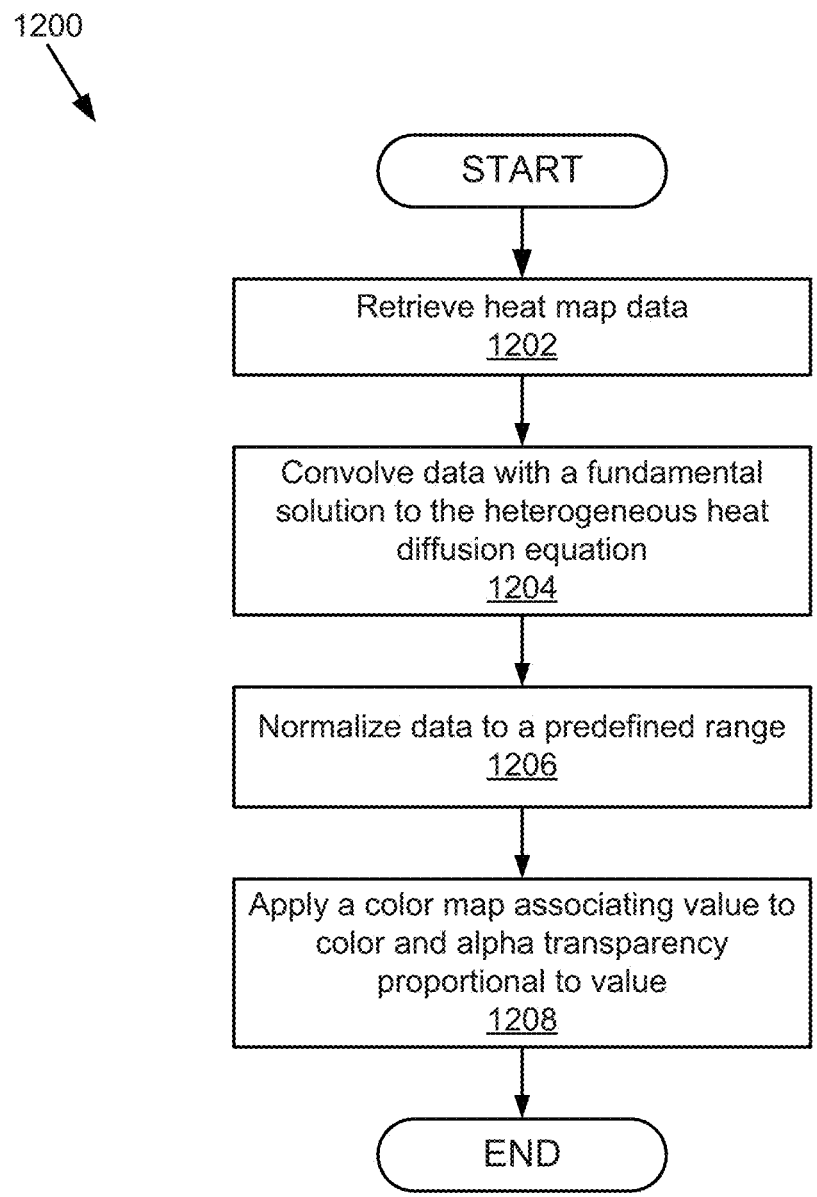
FIG. 12 is a flowchart of one embodiment of a method for generating a map of user attention or focus in accordance with the present invention.

Referring now to FIG. 12, one embodiment of a method 1200 for generating a map of user attention or focus will be described. In this embodiment, the map is referred to as a heat map and uses the heat map data structure generated in accordance with FIG. 11. The method 1200 begins by retrieving 1202 heat map data. For example, the populated zero value matrix described above with reference to FIG. 11 is retrieved. Next the method 1200 convolves 1204 the data in the matrix with the fundamental solution to the heterogeneous heat diffusion equation. For example, the method 1200 convolves data with Green's function to the heterogeneous heat diffusion equation: $\nabla^2 T - \partial T/\partial t = \delta(\overline{x})$. The method 1200 continues by normalizing 1206 the data to a predefined range. In one embodiment, the method 1200 applies normalization to make the range of T zero to 255, inclusive. Finally, the method 1200 applies 1208 a color map associating a value to color and an alpha transparency proportional to that value to produce the visual image.

Figure 13A:
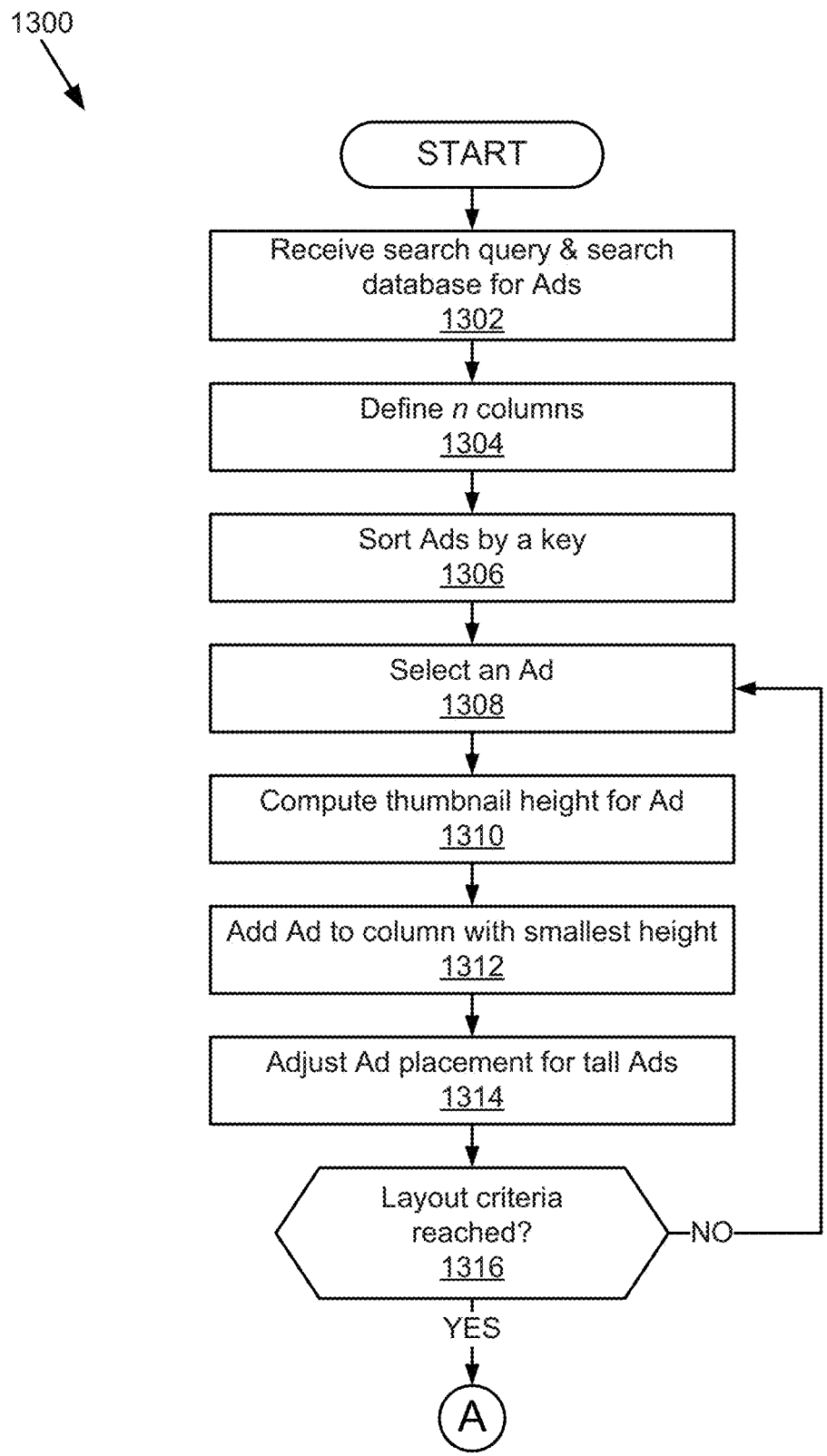
FIGS. 13A and 13B are a flowchart of one embodiment of a method for generating an ad search result interface in accordance with the present invention.
Figure 13B:
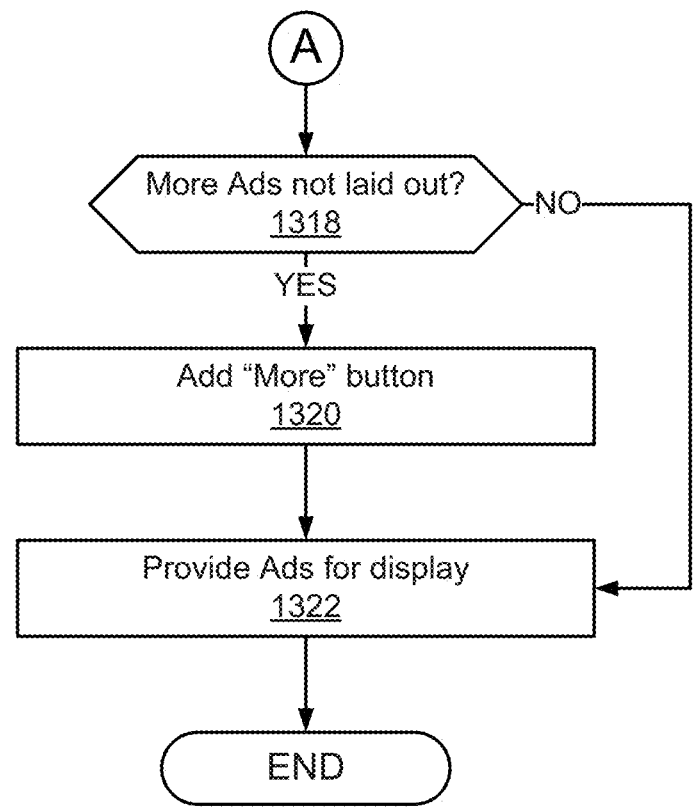

Referring now to FIGS. 13A and 13B, one embodiment of a method 1300 for generating an ad search result interface will be described. The method 1300 begins by receiving 1302 a search query, performing a search on the ad copy database 502, and returning result ads. Then the method 1300 defines 1304 n, the number of columns of tiles for the user interface. In one embodiment, n equals 3 or 4. The method 1300 continues by sorting 1306 the result ads by a key or other common parameter of the ads. In one embodiment, the key is set to be a default of the date and time of the most recent impression for the ads. The method 1300 continues to place the ads to form the user interface. The method 1300 starts with the smallest key and selects 1308 an ad. For the selected ad, the method 1300 computes 1310 the thumbnail height of the ad. Then the method 1300 adds 1312 the ad to the column with the smallest height. Then the method 1300 adjusts 1314 the ad placement for tall ads. For example, if ad is very tall (e.g., 160×600 pixels), place two ads side-by-side in the column; and if one tall and has been placed and is missing a partner, add the new ad next to it. Next, the method 1300 determines 1316 whether a layout criteria has been reached or satisfied. For example, layout criteria include: 1) no more matching ads; 2) an ad minimum has been reached (e.g., 100 ads per page); or 3) the pixel page height maximum has been reached (e.g., 500 pixels per column). Once the layout criteria are satisfied, the method 1300 returns and repeats steps 1308 to 1316. If the layout criteria are not satisfied, the method 1300 continues in step 1318 of FIG. 13B. Referring now also to FIG. 13B, the method 1300 next determines 1318 whether there are more ads that are not included in the tiled user interface. If so, the method 1300 adds 1320 a "more" button to the user interface that when selected by the user presents the remaining ads. After either step 1318 or step 1320, the method 1300 completes by providing the user interface including the ads for display. In particular, the user interface module 506 sends the tiled user interface to the client device 108. One example of such an interface is shown in FIG. 17.

Figure 14A:
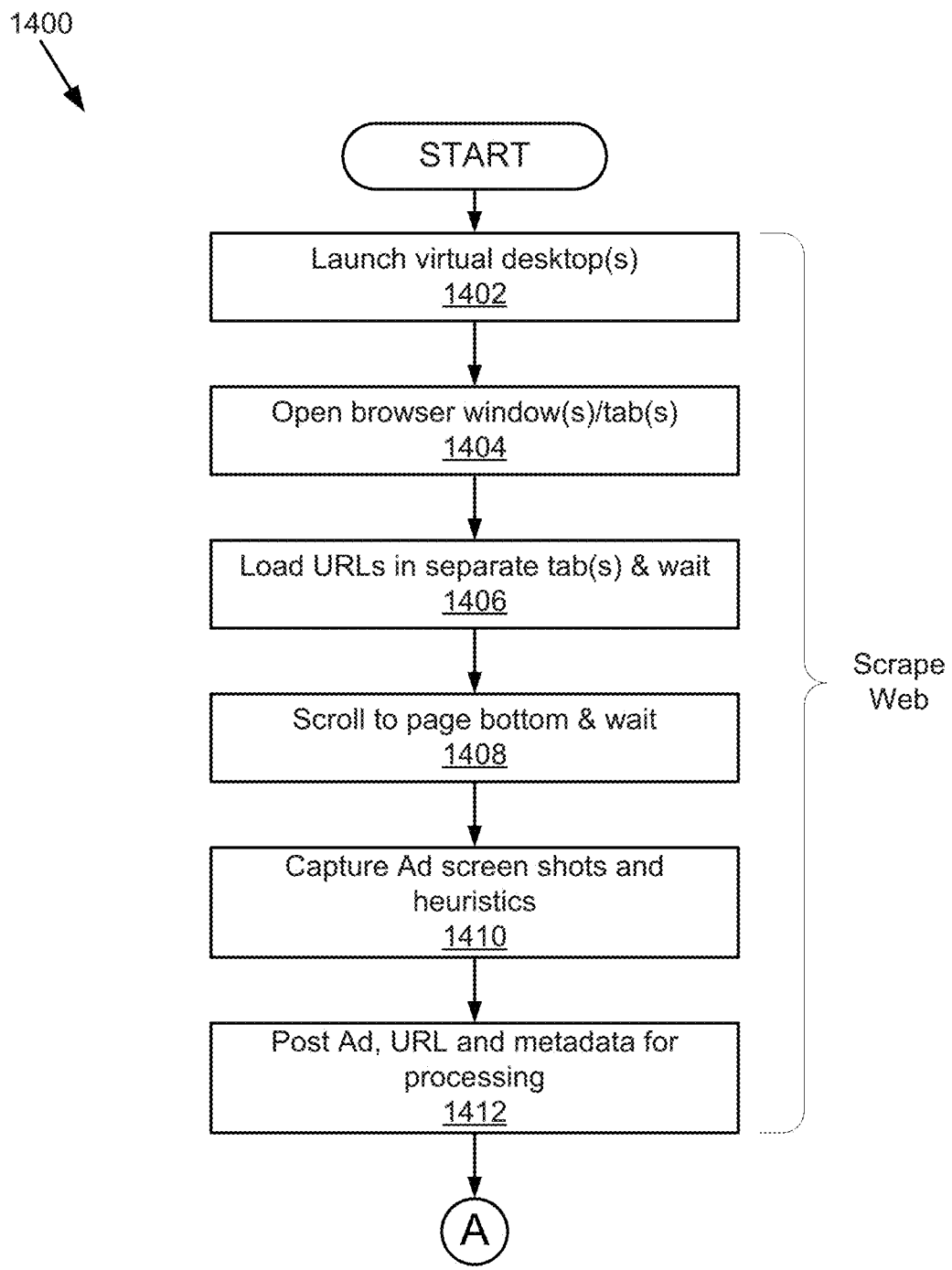
FIGS. 14A and 14B are a flowchart of one embodiment of a method for populating an ad database in accordance with the present invention.
Figure 14B:
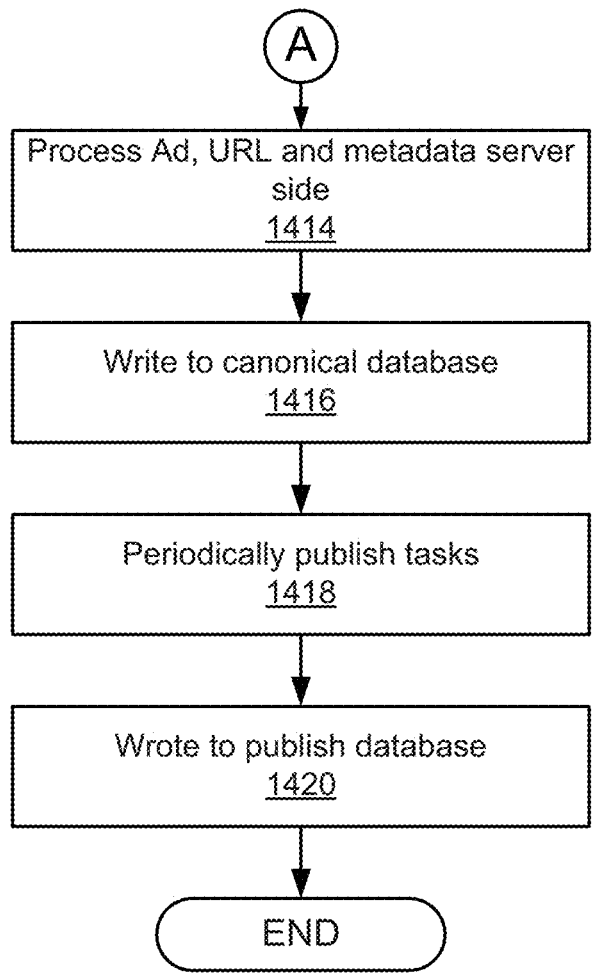

FIGS. 14A and 14B show one embodiment of a method 1400 for populating the ad copy database 502 in accordance with the present invention. The method 1400 begins by scraping the World Wide Web for ads. In one embodiment, steps 1402 through 1412 are performed by a Linux web scraper including a web browser such as Firefox, and Apache HTTP server and simple queue service from Amazon. The scraper boots and launches 1402 a plurality of virtual desktops. This is advantageous because the scraper can be scaled by increasing the number of virtual desktops according to the amount of scraping required. These virtual desktops then open up 1404 one or more browser windows or tabs. The browsers may be Firefox from Mozilla and include an Adobe flash plug-in and injected script of the present invention. Next, the method 1400 requests instructions in the tabs of the browsers. More specifically, the method 1400 loads 1406 separate uniform resource locators (URLs) into separate tabs of the browsers and waits for the web servers to respond and deliver the web page corresponding to the URL. For example, it may take up to 8 to 30 seconds for the web pages to start loading. The method 1400 then scrolls 1408 to the bottom of each web page and waits for any remaining content to be delivered to the web browsers. After scrolling to the bottom of the page, the method 1400 waits a predetermined amount of time. For example, the predetermined amount of time may be 45 seconds to ensure that the content for the web page has been provided to the virtual desktops. Next the method 1400 captures 1410 a screenshot of the advertisement and the ad characteristics or metadata. In one embodiment, the ad characteristics or metadata include the dimension of the ad, HREFs, SWF, file format and other metadata. The scraping completes by posting 1412 the ad screenshot, URL and other metadata for server-side processing by the analytics server 104. For example, the posted information may include the URL of the ad, a page identifier, then had identifier, X and Y dimensions of the ad, and ad type and flash variables. The method 1400 processes 1414 the ad, the URL and the metadata at the analytics server 104. The method 1400 continues by writing 1416 this information to the ad copy database 502 that may be a canonical database, for example. In one embodiment, the ad copy database 502 may hold millions of records corresponding to different advertisements ordered by impression identifier and advertising identifier. Periodically, the method 1400 publishes 1418 tasks or summary records of the information in the ad copy database 502. In one embodiment, the tasks are published every 60 seconds. The method 1400 writes 1420 this information to the analytics database 310. Once stored in the analytics database 310, this information can be queried by advertisers and others using a web front end and SQL queries.

Figure 15A:
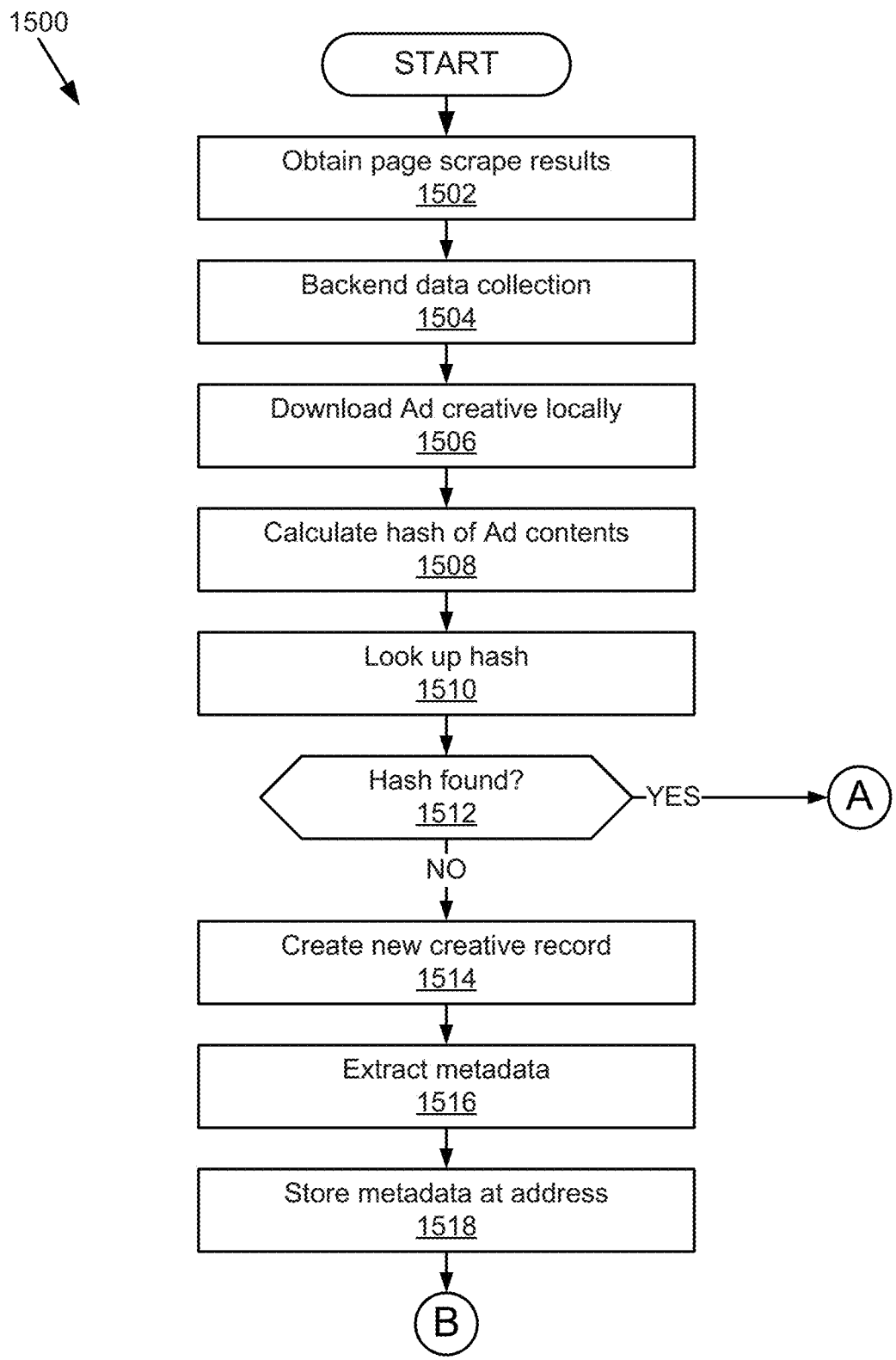
FIGS. 15A and 15B are a flowchart of one embodiment of a method for ad preservation in accordance with the present invention.
Figure 15B:
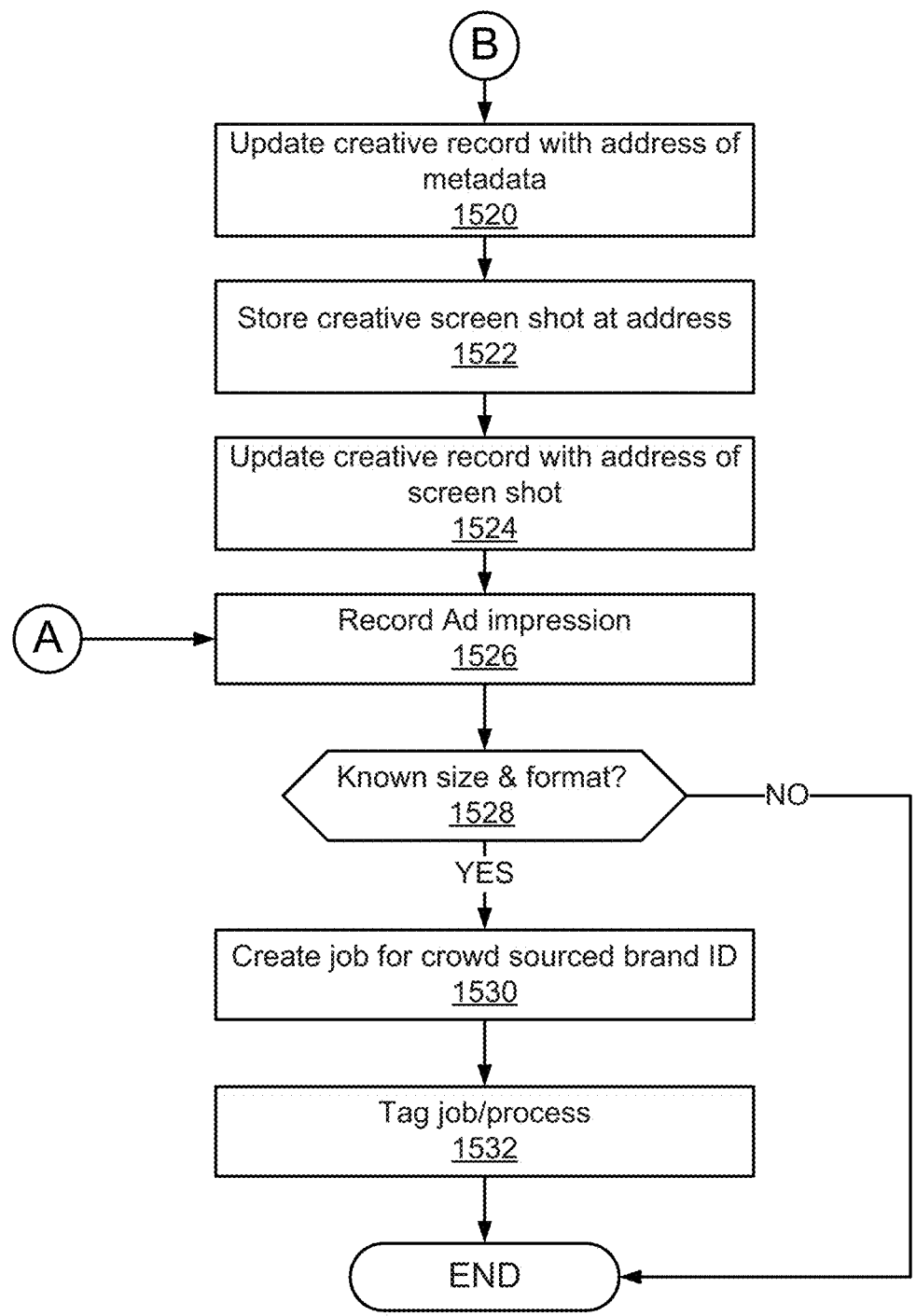

Referring now to FIGS. 15A and 15B, one embodiment of a method 1500 for ad preservation will be described. As has been noted above, the present invention is particularly advantageous because it can provide the ad, the ad context, and even replay the ad as it was presented to the user. This is in part made possible by the ad preservation method 1500 of FIGS. 15A and 15B. The ad preservation method 1500 begins by obtaining 1502 the ad page scrape results. The method 1500 processes the scrape results and performs 1504 backend data collection. Then the method 1500 downloads 1506 the creative content of the ad locally to the ad copy database 502 or storage 208. Next the method 1500 calculates a hash value for the ad contents, such as using a MD5 Message-Digest Algorithm. Hashes are used to minimize the amount of redundant content that needs to be stored in the ad copy database 502. The method 1500 continues by looking up 1510 the hash value in the ad copy database 502. Then the method 1500 determines 1512 whether the hashed value was found. If the hash value was found, the method 1500 proceeds to step 1526 of FIG. 15B and skips storing the creative content. On the other hand if the hashed value was not found, a new record is created in the ad copy database 502. If the hashed value was not found 1512, the method 1500 creates 1514 a new creative record. Then the method 1500 extracts 1516 metadata for the ad. In one embodiment, the extracted metadata includes the file type, file size, etc. In another embodiment, the extracted metadata includes a process for click tag identification. The other metadata is parsed to extract click tag information. For example, the method considers URL query parameters that include "click," or "click Tag," or any similarly named flash variables, protocol identifiers, and USL encoding. The method continues by storing 1518 the extracted metadata in the ad copy database 502. In addition, the ad contents may be stored locally at an address in the storage 208 of the ad search engine. Alternatively, the ad contents may be stored at an address in storage in the cloud or another remote file storage location. The method 1500 continues by updating 1520 the creative record with the address where the ad contents are stored. Then the method 1500 stores 1522 a creative screenshot at an address. The creative record is again updated 1524 with the address where the screenshot is stored. The method 1500 then records 1526 and an ad impression in the ad copy database 502. The record for the ad impression includes a URL, and an identifier, a creative record and the date and time. Then the method 1500 determines 1528 whether the image or asset has a known advertising size and format. If not, the method 1500 ends. However, if the image or asset has a known advertising size and format, the method 1500 proceeds to create 1530 a job for crowd source brand identification and then tag 1532 the job for processing. Then the method 1500 ends.

Figure 16:
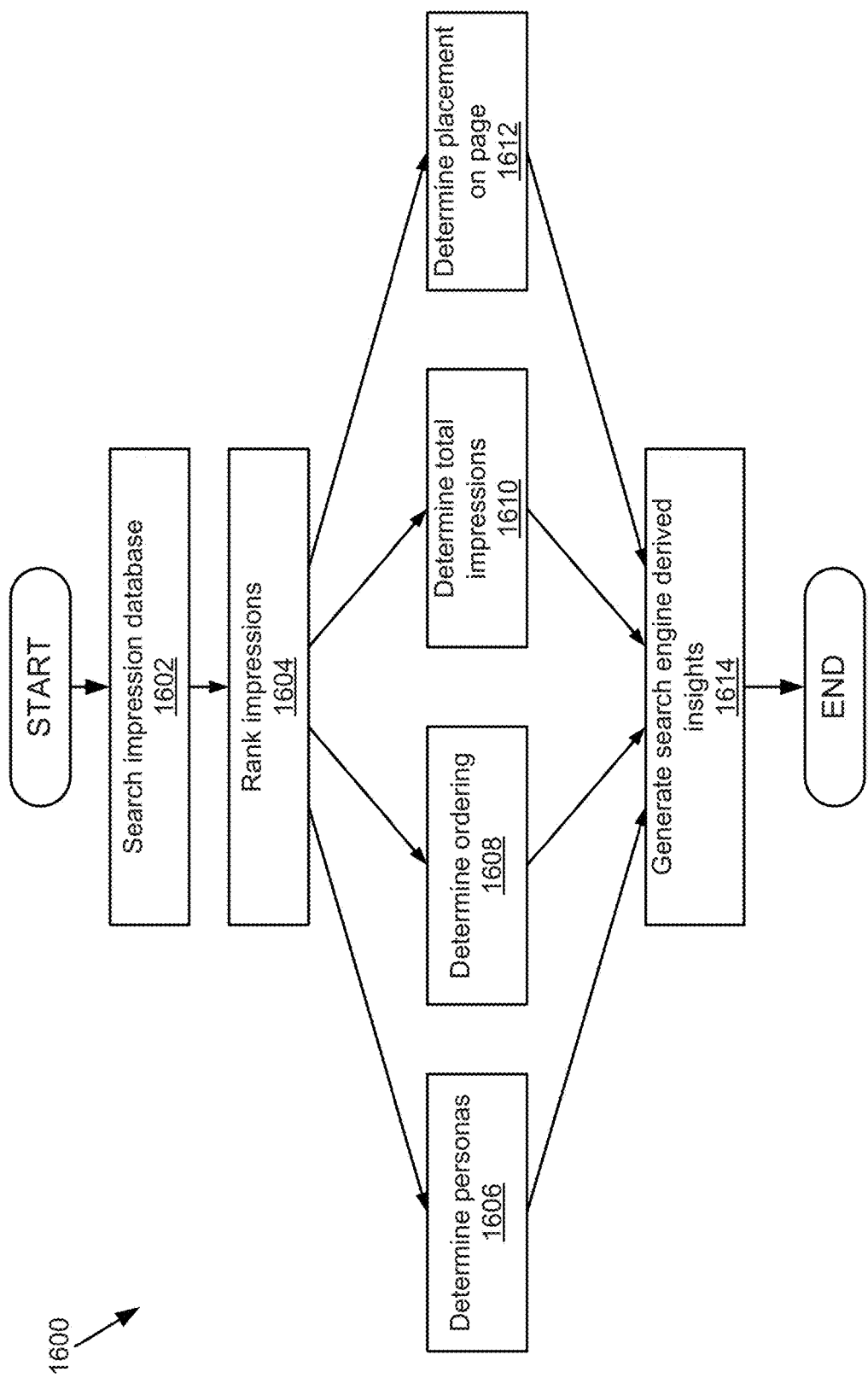
FIG. 16 is a flowchart of one embodiment of a method for generating derived insights in accordance with the present invention.

FIG. 16 shows one embodiment of a method 1600 for generating derived insight scores in accordance with the present invention. The method 1600 begins by searching 1602 the ad copy database 502 for impressions. In one embodiment, the method 1600 is run every 60 seconds. Then the method 1600 ranks 1604 the ad impressions by recency, importance or other variables. Next, the method 1600 performs various analysis on the ranked at impressions. The method 1600 determines 1606 different personas. For example, the method 1600 browses with different cookies, browses from other locations or mimics different browsers to determine whether these factors have any effect on ad placement. The method 1600 also determines 1608 ordering. For example, each URL is loaded multiple times. Step 1608 determines whether the impression was seen on the first load, the second load or a later load of the URL. The method 1600 also determines 1610 the number of impressions for each ad across multiple sites and multiple dates. Finally, the method 1600 determines 1612 the placement of the impression on the Web page. For example, the method 1600 determines whether the placement was above the fold, within an number of pixels of the top of the page or other location information. The method 1600 completes by generating 1614 the search engine derived insight score from the personas, ordering, total impressions and placement on the page.

User Interfaces

FIG. 17 shows a graphic representation of one example of a user interface 1700 showing advertisement search results. The search results are shown in a browser window 1702. The user interface 1700 includes a title area, a search box 1704, a suggestions area 1706, and the display area 1708 showing the plurality of tiles 1710 of different thumbnail images of advertising. The search box 1704 provides an area in which queries can be input and a search button for initiating a search of the ad copy database 502. The suggestion area 1706 includes a number of hypertext links of other searches that can be run on the ad copy database. Below the search box 1704, the interface 1700 provides an area for providing global information such as the total number of ads that are produced by a given query. In this example, the search term is "Starbucks" and the query returned 44 ad results. The display area 1708 advantageously provides the thumbnail images of the advertisements. The display area 1708 is populated with tiles 1710 of varying size but with matching proportionality so that the user has an impression from the thumbnail images of how the advertisement was presented as an impression. In this embodiment, the display area 1708 includes four columns. A particular ad 1712 is shown in the second column for ads down the top.

Referring now to FIG. 18, a graphic representation of a modified user interface 1800 is shown after the user has moved the cursor or gesture over ad 1712 of FIG. 17. For convenience and ease of understanding, similar reference numerals as used above in FIG. 17 are used in FIG. 18 to reference components of the user interface 1800 with the same or similar functionality. Moving the cursor or gesture over ad 1712 or moving the cursor or gesture over ad 1712 and clicking, causes the user interface module 506 of the ad search engine 132 to display the pop-up window 1802. The pop-up window 1802 includes a thumbnail image 1804 of the original advertisement and other metadata 1806 and controls. For example, the other metadata 1806 includes an identification of the brand, the date and time and domain of the impression and options to share the ad are flagged the ad. It should be understood that FIG. 18 shows only one embodiment of the metadata that can be provided according to the present invention. Other formats and metadata may be present as part of the pop-up window 1802.

Referring now to FIG. 19, a graphic representation of the modified user interface 1900 is shown. This version of the user for the user interface 1900 again presents the information in a browser window 1702. In addition to search for a particular brand, a search of a particular site can be performed by the search engine of the present invention. In addition to top label, a search box, suggestion box, and global information similar to that of user interfaces 1700 and 1800, the user interface 1900 also provides a brand summary area 1902 and a display area 1904. The brand summary area 1902 lists the brands that were advertised on the site that was queried. The display area 1904 is similar to that described above with reference to FIGS. 17 and 18 and also provides the same pop-up functionality as described above with reference to FIG. 18.

Systems and methods for advertising analytics and advertising searching have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of the Internet and on-line advertising; however, the disclosed technologies apply to other types of advertising.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
    modifying, by a computing device, a particular advertisement to create a modified advertisement, the modified advertisement including a data collection script that executes to collect activity data each time a triggering event associated with the particular advertisement is detected;
    transmitting, by the computing device, the modified advertisement to a plurality of user devices for display in a browser of each user device of the plurality of user devices;
    receiving, by the computing device and from the plurality of user devices, a set of activity data corresponding to the modified advertisement;
    identifying, by the computing device and for each activity data of the set of activity data, a pixel position corresponding to the activity data;
    generating, by the computing device, a heat map data structure by populating a zero value matrix using the pixel position corresponding to each of the activity data of the set of activity data;

generating, by the computing device, a visual image using the heat map data structure;

storing, by the computing device, the visual image in association with the particular advertisement;

receiving, by a user interface of the computing device, a query for one or more advertisements, the query received from a device over a network;

generating, by the computing device, a result based on the query, the result including a set of advertisements that satisfy the query, wherein the set of advertisements includes the particular advertisement and at least one additional advertisement that is different from the particular advertisement;

generating, by the computing device and for each advertisement of the set of advertisements, a tile, the tile including a thumbnail image of the advertisement and metadata, wherein the metadata stores a date and a time the advertisement was displayed by a user device and an identification of the user device;

displaying, by a display of the computing device, a set of tiles, each tile of the set of tiles displaying the thumbnail image corresponding to the advertisement, the tiles formatted by:
 defining a plurality of tile columns;
 sorting the set of tiles based on the metadata of the set of tiles; and
 adding tiles to each tile column to distribute the set of tiles among the plurality of tile columns;

receiving, from an input device of the computing device, a gesture over a particular tile from the set of tiles, the tile corresponding to the particular advertisement;

transmitting, to a remote server, an identification of the particular advertisement corresponding to the particular tile;

receiving, from the remote server, a display script having been generated by combining a playable version of the particular advertisement and the visual image associated with the particular advertisement; and executing, by the computing device, the display script so as to cause the playable version of the advertisement to be presented by the display of the computing device along with the visual image associated with the particular advertisement and one or more selectable controls to execute an action associated with the particular advertisement.

2. The method of claim 1, wherein the metadata of the tile includes a pixel location of the advertisement within a webpage that displayed the advertisement, an identification of a brand, a date and a time the advertisement was displayed on the webpage and a domain that hosted the webpage.

3. The method of claim 1, further comprising:
for each tile of the set of tiles:
 generating simulation data by simulating one or more user devices accessing a webpage that includes the advertisement of the tile, wherein simulating includes loading the webpage based on varying one or more of: cookies, time, date, and a number of times the webpage was loaded or reloaded to display the advertisement;
 identifying, using the simulation data, location data indicating a location of the advertisement in the webpage; and
 determining frequency data indicating a number of times the advertisement was displayed by a plurality of user devices.

4. A system, comprising:
a processor;
a non-transitory machine-readable storage medium containing instructions, which when executed by the processor, cause the processor to perform operations including:
modifying a particular advertisement to create a modified advertisement, the modified advertisement including a data collection script that executes to collect activity data each time a triggering event associated with the particular advertisement occurs;

transmitting the modified advertisement to a plurality of user devices for display in a browser of each user device of the plurality of user devices;

receiving, from the plurality of user devices, a set of activity data corresponding to the modified advertisement;

identifying, for each activity data of the set of activity data, a pixel position corresponding to the activity data;

generating a heat map data structure by populating a zero value matrix using the pixel position corresponding to each of the activity data of the set of activity data;

generating a visual image using the heat map data structure;

storing the visual image in association with the particular advertisement;

receiving a query for one or more advertisements, the query received from a device over a network;

generating a result based on the query, the result including a set of advertisements that satisfy the query, wherein the set of advertisements includes the particular advertisement and at least one additional advertisement that is different from the particular advertisement;

generating, for each advertisement of the set of advertisements, a tile, the tile including a thumbnail image of the advertisement and metadata, wherein the metadata stores a date and a time the advertisement was displayed by a user device and an identification of the user device;

displaying a set of tiles, each tile of the set of tiles displaying the thumbnail image corresponding to the advertisement, the tiles formatted by:
 defining a plurality of tile columns;
 sorting the set of tiles based on the metadata of the set of tiles; and
 adding tiles to each tile column to distribute the set of tiles among the plurality of tile columns;

receiving a gesture over a particular tile from the set of tiles, the tile corresponding to the particular advertisement;

transmitting, to a remote server, an identification of the particular advertisement corresponding to the particular tile;

receiving, from the remote server, a display script having been generated by combining a playable version of the particular advertisement and the visual image associated with the particular advertisement; and executing the display script so as to cause the playable version of the advertisement to be presented along with the visual image associated with the particular advertisement and one or more selectable controls to execute an action associated with the particular advertisement.

5. The system of claim 4, wherein the metadata of the tile includes a pixel location of the advertisement within a webpage that displayed the advertisement, an identification of a brand, a date and a time the advertisement was displayed on the webpage and a domain that hosted the webpage.

6. The system of claim 4, further comprising:
for each tile of the set of tiles:

generating simulation data by simulating one or more user devices accessing a webpage that includes the advertisement of the tile, wherein simulating includes loading the webpage based on varying one or more of: cookies, time, date, and a number of times the webpage was loaded or reloaded to display the advertisement;

identifying, using the simulation data and for each simulated user device of the simulated one or more user devices, location data indicating a location of the advertisement in the webpage; and determining frequency data indicating a number of times the advertisement was displayed by a plurality of user devices.

7. A non-transitory machine-readable storage medium containing instructions, which when executed by a processor, cause the processor to perform operations including:

modifying a particular advertisement to create a modified advertisement, the modified advertisement including a data collection script that executes to collect activity data each time a triggering event associated with the particular advertisement occurs;

transmitting the modified advertisement to a plurality of user devices for display in a browser of each user device of the plurality of user devices;

receiving, from the plurality of user devices, a set of activity data corresponding to the modified advertisement;

identifying, for each activity data of the set of activity data, a pixel position corresponding to the activity data;

generating a heat map data structure by populating a zero value matrix using the pixel position corresponding to each of the activity data of the set of activity data;

generating a visual image using the heat map data structure;

storing the visual image in association with the particular advertisement;

receiving, by a user interface, a query for one or more advertisements, the query received from a device over a network;

generating a result based on the query, the result including a set of advertisements that satisfy the query, wherein the set of advertisements includes the particular advertisement and at least one additional advertisement that is different from the particular advertisement;

generating, for each advertisement of the set of advertisements, a tile, the tile including a thumbnail image of the advertisement and metadata, wherein the metadata stores a date and a time the advertisement was displayed by a user device and an identification of the user device;

displaying, by a display device, a set of tiles, each tile of the set of tiles displaying the thumbnail image corresponding to the advertisement, the tiles formatted by:
defining a plurality of tile columns;
sorting the set of tiles based on the metadata of the set of tiles; and
adding tiles to each tile column to distribute the set of tiles among the plurality of tile columns;

receiving a gesture over a particular tile from the set of tiles, the tile corresponding to the particular advertisement;

transmitting, to a remote server, an identification of the particular advertisement corresponding to the particular tile;

receiving, from the remote server, a display script having been generated by combining a playable version of the particular advertisement and the visual image associated with the particular advertisement; and executing the display script so as to cause the playable version of the advertisement to be presented along with the visual image associated with the particular advertisement and one or more selectable controls to execute an action associated with the particular advertisement.

8. The non-transitory machine-readable storage medium of claim 7, wherein the metadata of the tile includes a pixel location of the advertisement within a webpage that displayed the advertisement, an identification of a brand, a date and a time the advertisement was displayed on the webpage and a domain that hosted the webpage.

9. The non-transitory machine-readable storage medium of claim 7, further comprising:
for each tile of the set of tiles:
generating simulation data by simulating one or more user devices accessing a webpage that includes the advertisement of the tile, wherein simulating includes loading the webpage based on varying one or more of: cookies, time, date, and a number of times the webpage was loaded or reloaded to display the advertisement;
identifying, using the simulation data and for each simulated user device of the simulated one or more user devices, location data indicating a location of the advertisement in the webpage; and
determining frequency data indicating a number of times the advertisement was displayed by a plurality of user devices.

* * * * *